(12) United States Patent  
Doe et al.

(10) Patent No.: US 9,077,032 B2  
(45) Date of Patent: Jul. 7, 2015

(54) ELECTRODE MATERIALS FOR MAGNESIUM BATTERIES

(75) Inventors: Robert Ellis Doe, Norwood, MA (US); Timothy Keith Mueller, Somerville, MA (US); Gerbrand Ceder, Wellesley, MA (US); Jeremy Barker, Oxfordshire (GB); Kristin Aslaug Persson, Orinda, CA (US)

(73) Assignee: PELLON TECHNOLOGIES, INC., Cambridge, MA (US)

( * ) Notice: Subject to any disclaimer, the term of this patent is extended or adjusted under 35 U.S.C. 154(b) by 687 days.

(21) Appl. No.: 13/410,537

(22) Filed: Mar. 2, 2012

(65) Prior Publication Data

US 2012/0219859 A1  Aug. 30, 2012

Related U.S. Application Data

(63) Continuation-in-part of application No. PCT/US2011/037951, filed on May 25, 2011.

(60) Provisional application No. 61/348,068, filed on May 25, 2010.

(51) Int. Cl.

| H01M 4/48 | (2010.01) |
|---|---|
| H01M 4/485 | (2010.01) |
| H01M 4/505 | (2010.01) |
| H01M 4/525 | (2010.01) |
| H01M 4/58 | (2010.01) |
| H01M 10/054 | (2010.01) |
| C01G 31/00 | (2006.01) |
| C01G 37/00 | (2006.01) |
| C01G 45/12 | (2006.01) |

(Continued)

(52) U.S. Cl.
CPC ............ *H01M 4/485* (2013.01); *Y02E 60/122* (2013.01); *H01M 4/131* (2013.01); *H01M 4/136* (2013.01); *H01M 4/505* (2013.01); *H01M 4/525* (2013.01); *H01M 4/58* (2013.01); *H01M 4/5815* (2013.01); *H01M 4/5825* (2013.01); *H01M 10/054* (2013.01); *C01G 31/00* (2013.01); *C01G 37/006* (2013.01); *C01G 45/1235* (2013.01); *C01G 49/00* (2013.01); *C01G 53/66* (2013.01); *C01P 2002/20* (2013.01); *C01P 2002/32* (2013.01); *C01P 2002/72* (2013.01); *C01B 25/372* (2013.01); *C01B 25/42* (2013.01); *C01B 25/45* (2013.01)

(58) Field of Classification Search
CPC .................................. H01M 4/48; H01M 4/58
USPC .................. 429/231.5, 231.6, 218.1
See application file for complete search history.

(56) References Cited

U.S. PATENT DOCUMENTS 4,366,215 A * 12/1982 Coetzer et al. ............ 429/199
6,426,164 B1 * 7/2002 Yamaura et al. .......... 429/231.6

OTHER PUBLICATIONS

P. Novak, et al., "Electrochemical insertion of magnesium in metal oxides and sulfides from aprotic electrolytes", 1993, J. Electrochem. Soc, 140, pp. 140-144.*

*Primary Examiner* — Ula C Ruddock
*Assistant Examiner* — Daniel Gatewood
(74) *Attorney, Agent, or Firm* — Milstein Zhang & Wu LLC; Joseph B. Milstein

(57) ABSTRACT

A compound of formula $A_{b'}Mg_aM_bX_y$ or $A_{b'}Mg_aM_b(XO_z)_y$ for use as electrode material in a magnesium battery is disclosed, wherein A, M, X, b', a, b, y, and z are defined herein.

13 Claims, 12 Drawing Sheets

(51) Int. Cl.
*C01G 49/00* (2006.01)
*C01G 53/00* (2006.01)
*C01B 25/37* (2006.01)
*C01B 25/42* (2006.01)
*C01B 25/45* (2006.01)
*H01M 4/131* (2010.01)
*H01M 4/136* (2010.01)

ELECTRODE MATERIALS FOR MAGNESIUM BATTERIES

RELATED APPLICATIONS

This application is a continuation-in-part of PCT Application No. PCT/US2011/37951, filed May 25, 2011, entitled "Electrode Materials for Magnesium Batteries", which claims the benefit of U.S. Provisional Patent Application Ser. No. 61/348,068, filed May 25, 2010, which are incorporated herein by reference.

FIELD OF INVENTION

The subject matter generally relates to electrode materials for use in magnesium batteries.

BACKGROUND

There is a continually increasing demand for devices capable of storing more energy per unit volume (Wh/l) or energy per unit mass (Wh/kg) than today's premier rechargeable Li-ion batteries. One increasingly sought after route to meeting this demand is to utilize divalent magnesium ($Mg^{2+}$), rather than the monovalent cation lithium ($Li^+$) because magnesium enables nearly twice as much charge to be transferred, per weight or volume, than $Li^+$ thus enabling high energy density. Furthermore the abundance of Mg metal and readily available compounds containing Mg can enable significant cost reduction relative to Li-ion batteries.

SUMMARY OF THE INVENTION

Though the advantages to rechargeable Magnesium batteries are commonly known there has been no previous commercialization of this type of battery. The failure to commercialize Mg batteries is, at least in part, due to one central technical obstacle to enabling rechargeable Mg batteries, i.e., the lack of suitable electrode materials capable of allowing reversible Mg insertion and removal at an appreciable rate of discharge and charge. The electrode materials for Mg battery described herein display low barrier to the diffusion of Mg while maintaining stability of the host structure in both the Mg-containing (magged) state and the Mg-removed (demagged) state while enabling useful reaction voltage and capacity.

In one aspect, a compound of formula $A_{b'}Mg_aM_bX_y$ for use as electrode material in a magnesium battery is described, wherein A is one or more dopants selected from the group consisting of Al, Li, Na, K, Zn, Ag, Cu, and mixtures thereof;

M is one or more transition metals selected from the group consisting of V, Cr, Mn, Fe, Co, Ni, Cu, Ag, Zr, and mixtures thereof;

X is one or more anions selected from the group consisting of O, S, Se, F, and mixtures thereof;

$0 \le b' \le 2.9$;
$0 \le a \le 2.1$;
$0.5 \le b \le 2.9$;
$1.5 \le y \le 5.9$; and the compound has a layered structure or a spinel structure, wherein the layered structure comprises close-packed anion X lattice, layers of octahedrally-coordinated transition metal M, and layers of fully or partially occupied magnesium sites, wherein the layers of metal M and the layers of magnesium sites alternate; and the spinel structure comprises close-packed anion X lattice, wherein the transition metal occupies the octahedral sites and Mg occupies the tetrahedral sites;

provided that the compound is not layered $Mg_aVS_2$, spinel $Mg_aCo_3O_4$, layered $Mg_aV_2O_5$, rocksalt $Mg_aMnO$, spinel $Mn_2O_4$, spinel $Mg_aMn_2O_4$, spinel $Mg_aMn_3O_4$, or layered $Mg_aZrS_2$.

In some embodiments, b' is 0 and the compound has a formula of $Mg_aM_bX_y$.

In any of the preceding embodiments, b is about 1 and y is about 2.

In any of the preceding embodiments, b is about 2 and y is about 4.

In any of the preceding embodiments, M is one or more transitional metals selected from the group consisting of Cr, Mn, Ni, Co, and mixtures thereof and X is one or more anions selected from the group consisting of O, S, F, and mixtures thereof.

In any of the preceding embodiments, the compound has a unit cell atomic arrangement isostructural with a layered material comprising primarily Mg layer dispersed between primarily transition metal layers.

In any of the preceding embodiments, the compound has a unit cell atomic arrangement isostructural to spinel unit cell and Mg occupies the tetrahedral site.

In any of the preceding embodiments, the compound has a magnesium diffusion barrier of less than 0.8 eV.

In any of the preceding embodiments, the compound is layered $MgVO_3$.

In any of the preceding embodiments, the compound is $MgCr_2S_4$ spinel.

In any of the preceding embodiments, $0.05 \le ' 3.9$.

In another aspect, a compound of formula $A_{b'}Mg_aM_b(XO_z)_y$ for use as electrode material in a magnesium battery is described, wherein A is one or more dopants selected from the group consisting of Al, Li, Na, K, Zn, Ag, Cu, and mixtures thereof;

M is one or more transition metals selected from the group consisting of Ti, V, Cr, Mn, Fe, Co, Ni, Cu, Zr, Nb, Mo, Sn, Sb, Bi, Ta, W, and mixtures thereof;

X is one or more anions selected from the group consisting of P, V, Si, B, C, As, S, N, and mixtures thereof;

$0 \le b' \le 3.9$;
$0 \le a \le 3.1$;
$0.9 \le b \le 3.9$;
$0.9 \le y \le 3.9$;
$1.9 \le z \le 3.9$; and the compound has an olivine structure or a NASICON structure, or the compound is isostructural with the $LiVP_2O_7$ structure or the vanadium oxy-phosphate $VO(PO_4)$ structure;

provided that the compound is not $Mg_aMnSiO_4$ or $Mg_{0.5}Ti_2(PO_4)_3$.

In any of the preceding embodiments, b' is 0 the compound has a formula of $Mg_aM_b(XO_z)_y$.

In any of the preceding embodiments, $0 \le a \le 2$, b is about 1, y is about 1, and $3 \le z \le 3.9$.

In any of the preceding embodiments, $0 \le a \le 3$, b is about 2, y is about 3, and $3 \le z \le 3.9$.

In any of the preceding embodiments, $0 \le a \le 1.53$, b is about 0.5, y is about 1, and $3 \le z \le 3.9$.

In any of the preceding embodiments, the compound has a unit cell atomic arrangement isostructural with a monoclinic or rhombohedral NASICON unit cell.

In any of the preceding embodiments, X is P.

In any of the preceding embodiments, $(XO_z)_y$ is $P_2O_7$ and the compound is isostructural with $VP_2O_7$.

In any of the preceding embodiments, the compound has a unit cell atomic arrangement isostructural with a beta-$VOPO_4$ unit cell.

In any of the preceding embodiments, the compound has a unit cell atomic arrangement isostructural with a cubic diphosphate $TiP_2O_7$ unit cell.

In any of the preceding embodiments, the compound has a magnesium diffusion barrier of less than 0.8 eV.

In any of the preceding embodiments, the compound is olivine $MgFe_2(PO_4)_2$.

In any of the preceding embodiments, the compound has the compound is NASICON $MgFe_2(PO_4)_3$ or $MgV_2(PO_4)_3$.

In any of the preceding embodiments, $0.05 \leq b' \leq 3.9$.

In yet another aspect, a method of synthesizing a compound of any of the preceding claims by solid state synthesis, co-precipitation, or carbothermal reduction from magnesium containing precursor is described, wherein the magnesium containing precursor is one or more compounds selected from the group consisting of MgO, $Mg(OH)_2$, $MgCO_3$, $MgSO_4$, MgS, $MgF_2$, $MgHPO_4$, Mg metal, and mixtures thereof.

In yet another aspect, a method of synthesizing a compound of any of the proceeding embodiments is described, comprising using a precursor compound containing one or more metals selected from the group consisting of Cu, Zn, Ag, Na, K, Rb, Cd, Ca, Sr, Ba, and combinations thereof and chemically or electrochemically extracting the metal and replacing the metal with Mg by chemical or electrochemical insertion.

In yet another aspect, a magnesium battery electrode is described, comprising a compound of any of the proceeding embodiments.

In yet another aspect, a magnesium battery electrode is described, comprising a compound of formula $A_{b'}Mg_aM_bX_y$, for use as electrode material, wherein A is one or more dopants selected from the group consisting of Al, Li, Na, K, Zn, Ag, Cu, and mixtures thereof.

M is one or more transition metals selected from the group consisting of V, Cr, Mn, Fe, Co, Ni, Cu, Ag, Zr, and mixtures thereof.

X is one or more anions selected from the group consisting of O, S, Se, F, and mixtures thereof;

$0 \leq b' \leq 2.9$;
$0 \leq a \leq 2.1$;
$0.5 \leq b \leq 2.9$;
$1.5 \leq y \leq 5.9$; and the compound has a layered structure or a spinel structure, wherein the layered structure comprises close-packed anion X lattice, layers of octahedrally-coordinated transition metal M, and layers of fully or partially occupied magnesium sites, wherein the layers of metal M and the layers of magnesium sites alternate; and the spinel structure comprises close-packed anion X lattice, wherein the transition metal occupies the octahedral sites and Mg occupies the tetrahedral sites;

provided that the compound is not layered $VS_2$, spinel $Co_3O_4$, layered $V_2O_5$, rocksalt MnO, spinel $Mn_2O_4$, spinel $Mn_3O_4$, or layered $ZrS_2$.

In yet another aspect, a magnesium battery electrode is described, comprising a compound of formula $A_{b'}Mg_aM_b(XO_z)_y$ for use as electrode material in a magnesium battery, wherein A is one or more dopants selected from the group consisting of Al, Li, Na, K, Zn, Ag, Cu, and mixtures thereof;

M is one or more transition metals selected from the group consisting of Ti, V, Cr, Mn, Fe, Co, Ni, Cu, Zr, Nb, Mo, Sn, Sb, Bi, Ta, W, and mixtures thereof;

X is one or more anions selected from the group consisting of P, V, Si, B, C, As, S, N, and mixtures thereof;

$0 \leq b' \leq 3.9$;
$0 \leq a \leq 3.1$;
$0.9 \leq b \leq 3.9$;
$0.9 \leq y \leq 3.9$;
$1.9 \leq z \leq 3.9$; and the compound has an olivine structure or a NASICON structure, or the compound is isostructural with the $LiVP_2O_7$ structure or the vanadium oxy-phosphate $VO(PO_4)$ structure;

provided that the compound is not $Mg_aMnSiO_4$ or $Mg_{0.5}Ti_2(PO_4)_3$.

In any of the preceding embodiments, the compound has a layered structure.

In any of the preceding embodiments, the compound has a spinel structure.

In any of the preceding embodiments, the electrode further comprises an electronically conductive additive.

In any of the preceding embodiments, the conductive additive is carbon black.

In any of the preceding embodiments, the electrode further comprises a binder.

In any of the preceding embodiments the binder is one or more compound selected from the group consisting of polyvinylidene fluoride, polytetrafluoroethylene, and terpolymer or copolymer thereof.

In yet another aspect, a energy-storing device is described, comprising:

a first electrode comprising the compound of any of the proceeding embodiments; and a second electrode comprising a magnesium metal, a magnesium alloy, or the compound of any of the proceeding embodiments.

As used herein, two crystalline compounds are isostructural if they have the same crystalline structure, but not necessarily the same cell dimensions nor the same chemical composition, and with a comparable variability in the atomic coordinates to that expected from the cell dimensions and chemical composition.

As used herein, close-packed lattice is a term of art referring to a dense arrangement of spheres in a lattice. It is well understood in the art that close-packing structure includes normal routine derivations.

DETAILED DESCRIPTION

Figure 1:
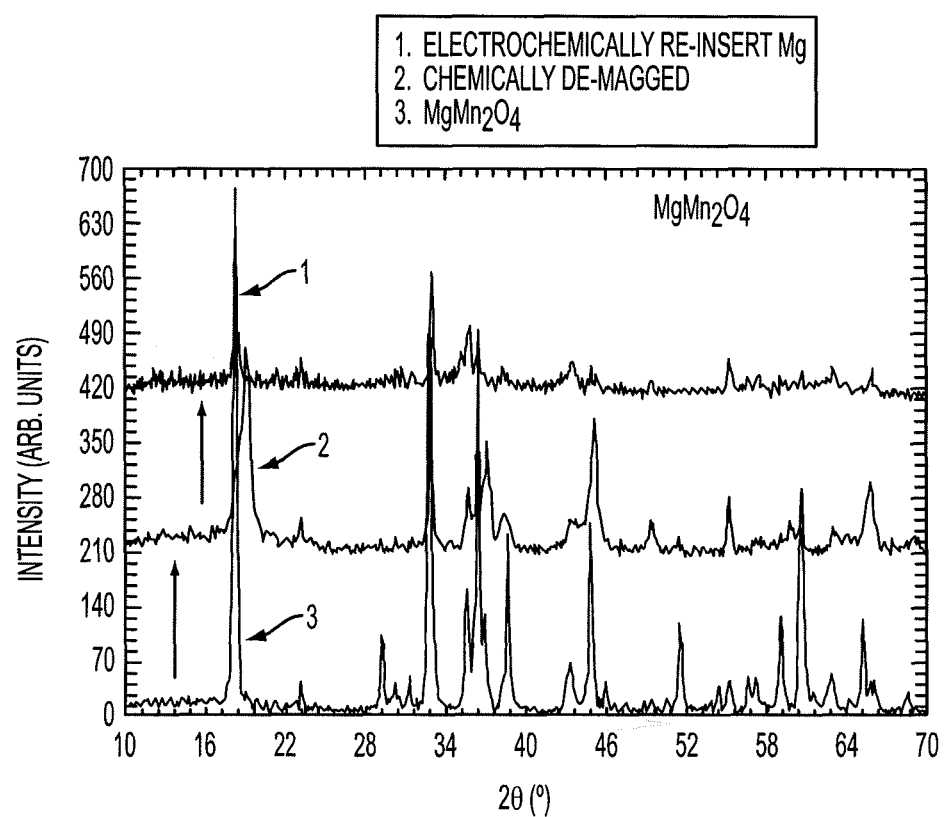
FIG. 1 is an X-ray diffraction (XRD) pattern of $MgMn_2O_4$ spinel demonstrating chemical Mg extraction and electrochemical magnesium insertion according to one or more embodiments. This is the X-Ray diffraction spectra corresponding to a sample of $MgMn_2O_4$ spinel, which was synthesized, then immersed in acid to remove Mg. Following that the sample was placed in an electrochemical test cell to electrochemically reinsert Mg.

The materials and classes of materials, described herein, are promising for use as magnesium insertion materials in magnesium-ion batteries. The rate of magnesium insertion into these materials is comparable to or better than the rate of the magnesium insertion into Chevrel-phase compounds, and a battery with a magnesium anode and one of these materials as cathode has significantly higher theoretical energy density and specific energy than a similar battery with a Chevrel-phase cathode. Chevrel compounds are series of ternary molybdenum chalcogenide compounds first reported by R. Chevrel, M. Sergent, and J. Prigent in 1971. The Chevrel compounds have the general formula $M_xMo_6X_8$, where M represents any one of a number of metallic elements throughout the periodic table; x has values between 1 and 4, depending on the M element; and X is a chalcogen (sulfur, selenium or tellurium).

Materials as active materials in the electrodes of rechargeable Magnesium (Mg) batteries are described. These materials demonstrate high Mg mobility through the host crystal structure when the material is in both the charged and discharged state thus enabling transfer of charge to occur at useful rates during charge and discharge. In certain embodiments, the magnesium material has a magnesium diffusion barrier of less than 0.8 eV. The low diffusion barrier of the materials as described herein enables the material to be used as electrode active material in a magnesium battery. Additionally, the materials as described herein exhibit useful reaction voltage, high theoretical specific capacity, and stability during the electrochemical reaction.

Applicants have surprisingly discovered that compounds or materials having a magnesium diffusion barrier of less than 0.8 eV result in high rates of Mg-insertion into the compounds and Mg-extraction out of the compounds, which enables the compounds to be used in a magnesium battery. In some embodiments, the compounds as described herein has a magnesium diffusion barrier of less than 0.8 eV. In some embodiments, the compounds as described herein has a magnesium diffusion barrier of less than 0.7 eV. In some embodiments, the compounds as described herein has a magnesium diffusion barrier of less than 0.6 eV. In some embodiments, the compounds as described herein has a magnesium diffusion barrier of less than 0.5 eV. In some embodiments, the compounds as described herein has a magnesium diffusion barrier of less than 0.4 eV. In some embodiments, the compounds as described herein has a magnesium diffusion barrier of less than 0.3 eV. In some embodiments, the compounds as described herein has a magnesium diffusion barrier of less than 0.2 eV. In some embodiments, the compounds as described herein has a magnesium diffusion barrier of less than 0.1 eV. In some embodiments, the compounds as described herein has a magnesium diffusion barrier of more than 50 meV and less than 0.8 eV. In some embodiments, the compounds as described herein has a magnesium diffusion barrier of more than 100 meV and less than 0.7 eV. In some embodiments, the compounds as described herein has a magnesium diffusion barrier of more than 150 meV and less than 0.6 eV. In some embodiments, the compounds as described herein has a magnesium diffusion barrier of more than 200 meV and less than 0.5 eV. The low magnesium diffusion barrier of the compounds as described herein allows efficient reversible Mg insertion and removal at an appreciable rate of discharge and charge and enables the materials to be used as electroactive materials for the magnesium electrodes. Furthermore, materials with high Mg mobility barriers would be excluded, based on expected poor Mg mobility and therefore very low rate capability. These criteria based on computations of Mg barriers provide a powerful means of identifying materials (known and unknown) with good Mg mobility and hence potential application as Mg electrode materials.

In one aspect, a compound of formula $A_{b'}Mg_aM_bX_y$ for use as electrode material in a magnesium battery is described, wherein A is one or more dopants selected from the group consisting of Al, Li, Na, K, Zn, Ag, Cu, and mixtures thereof;

M is one or more transition metals selected from the group consisting of V, Cr, Mn, Fe, Co, Ni, Cu, Ag, Zr, and mixtures thereof;

X is one or more anions selected from the group consisting of O, S, Se, F, and mixtures thereof;

$0 \leq b' \leq 2.9$;

$0 \leq a \leq 2.1$;

$0.5 \leq b \leq 2.9$;

$1.5 \leq y \leq 5.9$; and the compound has a layered structure or a spinel structure, wherein the layered structure comprises close-packed anion X lattice, layers of octahedrally-coordinated transition metal M, and layers of fully or partially occupied magnesium sites, wherein the layers of metal M and the layers of magnesium sites alternate; and the spinel structure comprises close-packed anion X lattice, wherein the transition metal occupies the octahedral sites and Mg occupies the tetrahedral sites;

not layered $Mg_aVS_2$, spinel $Mg_aCo_3O_4$, layered $Mg_aV_2O_5$, rocksalt $Mg_aMnO$, spinel $Mn_2O_4$, spinel $Mg_aMn_2O_4$, spinel $Mg_aMn_3O_4$, or layered $Mg_aZrS_2$.

In some embodiments, the compound is not layered $A_{b'}Mg_aVS_2$, spinel $A_{b'}Mg_aCo_3O_4$, layered $A_{b'}Mg_aV_2O_5$, rocksalt $A_{b'}Mg_aMnO$, spinel $A_{b'}Mg_aMn_2O_4$, spinel $A_{b'}Mg_aMn_3O_4$, or layered $A_{b'}Mg_aZrS_2$. In some embodiments, the compound is not layered $VS_2$, spinel $Co_3O_4$, layered $V_2O_5$, rocksalt MnO, spinel $Mn_2O_4$, spinel $Mn_2O_4$, spinel $Mn_3O_4$, or layered $ZrS_2$.

In some embodiments, b' is 0 and the compound has a formula of $Mg_aM_bX_y$. In some embodiments, b' is not 0 and the dopant A partially substitute for the transition metals to enhance the performance or cost of the electrode material. Batteries containing magnesium anodes and cathodes comprising of these materials have also higher theoretical energy density and specific energy than current commercial lithium-ion batteries, specified by a carbonaceous insertion anode.

In certain embodiments, the material is a layered compound having the general formula $Mg_aM_bX_y$, wherein "M" is a metal cation, or mixture of metal cations and "X" is an anion or mixture of anions. In some embodiments, X is oxygen (O), sulfur (S), selenium (Se) or fluoride (F), or mixtures thereof. The structures can have a close-packed lattice of O, S, Se, or F, with layers of octahedrally-coordinated metals that are capable of being oxidized during Mg extraction (for example, selected from the group consisting of V, Cr, Mn, Fe, Co, Ni, Cu, Ag, or mixtures thereof) alternating with layers of fully or partially occupied magnesium sites. In certain embodiments, M is one or more transitional metals selected from the group consisting of Cr, Mn, Ni, Co, and mixtures thereof; and X is one or more anions selected from the group consisting of O, S, F, and mixtures thereof. In other embodiments, M is one or more transitional metals selected from the group consisting of V, Cr, Mn, Fe, Ni, Co, and mixtures thereof; and X is one or more anions selected from the group consisting of O, S, F, and mixtures thereof.

In some embodiments, b' is 0. In some embodiments, the compound is in an oxidized state and a is about 0. In some embodiments, the compound is in a reduced state and a is about 2. In some embodiments, b is about 1 and y is about 2. In other embodiments, b is about 2 and y is about 4.

In certain embodiments, b' is in the range of $0.05 \leq b' \leq 2.9$. In certain embodiments, b' is in the range of $0.05 \leq b' \leq 2.0$. In certain embodiments, b' is in the range of $0.05 \leq b' \leq 1.5$. In certain embodiments, b' is in the range of $0.05 \leq b' \leq 1.0$. In certain embodiments, b' is in the range of $0.1 \leq b' \leq 2.0$. In certain embodiments, b' is in the range of $0.2 \leq b' \leq 1.5$. In certain embodiments, a is in the range of $0 \leq a \leq 2$. In certain embodiments, a is in the range of $0.5 \leq a \leq 1.5$. In certain embodiments, a is in the range of $0.75 \leq a \leq 1.25$. In certain embodiments, b is in the range of $0.5 \leq b \leq 2$. In certain embodiments, b is in the range of $0.75 \leq b \leq 1.5$. In certain embodiments, b is in the range of $0.75 \leq b \leq 1.0$. In certain embodiments, a is in the range of $0.75 \leq a \leq 1.25$. In certain embodiments, y is in the range of $1.5 \leq y \leq 5.0$. In certain embodiments, y is in the range of $2.0 \leq y \leq 4.5$. In certain embodiments, y is in the range of $2.5 \leq y \leq 3.5$. In certain embodiments, y is in the range of $3 \leq y \leq 3.5$. All ranges of a, b, b', and y can be combined with any of the recited ranges for a, b, b', and y.

In one or more embodiments, the material includes layered transition metal oxides, sulfides, and selenides, with layers of octahedrally-coordinated transition metals alternating with layers of fully or partially occupied magnesium sites. In particular embodiments, the layered compound include oxides containing transition metals such as V, Cr, Ni, Mn, Co, or mixtures thereof on the transition metal site. Examples of compositions that are able to insert nearly one magnesium ion per two transition metal ions include $CoMn_2O_6$ and $CrS_2$. In other embodiments, the material includes sulfides and selenides containing V, Mn, or Cr as the transition metals. These sulfide and selenide materials provide lower voltage (~0.25 V to ~2.25 V vs. $Mg/Mg^{2+}$) and may also be useful in magnesium insertion anodes.

In some embodiments, the compound described herein has a unit cell atomic arrangement isostructural with a layered material comprising primarily Mg layer dispersed between primarily transition metal layers. In some embodiments, the compound described herein has a unit cell atomic arrangement isostructural to spinel unit cell and Mg occupies the tetrahedral site. In some specific embodiments, the compound is layered $MgVO_3$. In some specific embodiments, the compound is $MgCr_2S_4$ spinel.

In some embodiments, the compound described herein can be synthesized by cationic exchange of magnesium for the lattice cation in compounds such as $AMX_2$ wherein A is preferably Na, K, Cu, Ag and X=O, S, Se, or F. Possible starting compositions identified for this purpose include $NaCrS_2$, $NaVS_2$, $CuFeO_2$, $CuCoO_2$, $NaCoO_2$, $CuNi_{0.33}V_{0.67}O_2$, $KCrS_2$, $AgNiO_2$, $AgCrO_2$, $KCrO_2$, $NaCrSe_2$, $NaVSe_2$. In some embodiments, the cation 'A' is electrochemically or chemically removed or exchanged. In these embodiments, Li is used (as described in U.S. Pat. No. 6,426,164, which describes use of $LiCoO_2$ or $LiNiO_2$). Lithium, due to its size, can alter the lattice parameter of some ternary layered transition metal oxides in a fashion that is less favorable for migration of Mg into the host structure, than the A site cations identified above. Furthermore some combinations of Li/M allow for greater degree of disorder of the transition metal hopping into the Li layer, which can also inhibit Mg migration. The A-site cations proposed herein when A=Na, K, Cu, or Ag can mitigate this disorder, promoting facile migration of Mg into and out of the host structure.

In some embodiments, magnesium vanadium oxides include $MgV_2O_5$ and $MgVO_3$. Though Mg insertion into $V_2O_5$ has been previously examined, no previous works exists in which $MgV_2O_5$ is directly synthesized and Mg is electrochemically removed. The as-synthesized $MgV_2O_5$ structure is different than the as-synthesized $V_2O_5$ structure as there is a different stacking of $V_2O_5$ layers between them. This enables a difference in Mg diffusion within the two forms of $MgV_2O_5$. The direct synthesis and then electrochemical removal of Mg is preferred on this basis. In some embodiments, the ternary vanadium oxide, $MgVO_3$, is used as an electrode material in an Mg battery.

In some embodiments, the compound is spinel $MgAl_2O_4$. In other embodiments, the compound has a structure isostructural with spinel ($MgAl_2O_4$). Spinels are a class of compounds that crystallize in the cubic (isometric) crystal system, with the oxide anions arranged in a cubic close-packed lattice and the cations A and B occupying some or all of the octahedral and tetrahedral sites in the lattice. Some spinels undergo a cubic to tetragonal distortion of the lattice when forming with Mg in the tetrahedral sites. The electroactive magnesium spinel compound can have the general formula $Mg_aM_bX_y$, wherein "M" is a metal cation or mixture of metal cations (for example, selected from the group consisting of V, Cr, Mn, Fe, Co, Ni, Cu, Ag, Zr, or mixtures thereof) and "X" is an anion or mixture of anions, most often oxygen (O), sulfur (S), selenium (Se) or fluoride (F). The transition metals occupy the octahedral sites and magnesium occupies the tetrahedral sites for the preferred materials described herein. Spinel materials in which all of the tetrahedral sites are occupied by a metal cation other than Mg (e.g. $Co_3O_4$) are excluded here as they exhibit high barriers to Mg diffusion. For example Co in $Co_3O_4$ spinel occupies both tetrahedral and octahedral sites, so upon Mg insertion the structure becomes akin to rock salt structure, rather than spinel. In some embodiments, other elements, such as Al, Li, Zn, and Mg, may be partially substituted for the transition metals to enhance the performance or cost of the electrode material. The magnesium ion may be partially or completely reversibly extracted from the material electrochemically yielding specific capacity >150 mAh/g. Batteries containing magnesium anodes and cathodes comprising these materials are capable of higher energy density and specific energy than commercial lithium-ion batteries.

In other embodiments, the compound is spinel $MgMn_2O_4$. In these embodiments, the compound has a tetragonal form. In other embodiments, a cubic modification to the tetragonal form can occur, which increases the Mg to Mn ratio. In some specific embodiments, the Mg to Mn ratio is ≤2. In still other embodiments, the compound described herein is a spinel $MgMn_2O_4$ spinel. In still other embodiments, the compound described herein includes a spinel having the following transition metals: Ni, Ni/Mn, Co, Ni/Mn/Co, Fe, Cr, Cr/Mn, V, or V/Cr.

Previous work on reactions of Mg with manganese oxides have been published as well as studies in which Li$^+$ was removed from $LiMn_2O_4$ and then replaced (chemically or electrochemically) with Mg. In Kurihawa et. al, Chemistry Letters Vol. 37, 376-377 (2008), $MgMn_2O_4$ was prepared from one of the example sets of precursors as described herein (i.e. from MgO and $Mn_2O_3$), however the synthesis of $MgMn_2O_4$ was included by "atmospheric pressure microwave discharge using CF pieces", rather than by the solid-state synthesis, carbothermal reduction, or co-precipitation methods as described herein. Furthermore, the highest diffusion of Mg within the spinel structure is obtained by extracting Mg from the material according to the reaction:

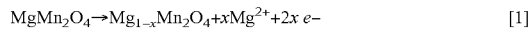

$$MgMn_2O_4 \rightarrow Mg_{1-x}Mn_2O_4 + xMg^{2+} + 2x\,e- \qquad [1]$$

Hence the more favorable Mg diffusion will enable a greater degree of Mg extraction, and closer to the theoretical limit of capacity (270 mAh/g) at ~2.9 V vs. Mg/Mg$^{2+}$ according to the modeling studies described herein. In contrast, Kurihawa et. al. only explores Mg insertion into $MgMn_2O_4$ between 2.0 and -0.5 V vs. Mg/Mg$^{2+}$, which accordingly corresponds to the following reaction:

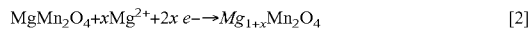

$$MgMn_2O_4 + xMg^{2+} + 2x\,e- \rightarrow Mg_{1+x}Mn_2O_4 \qquad [2]$$

Figure 2:
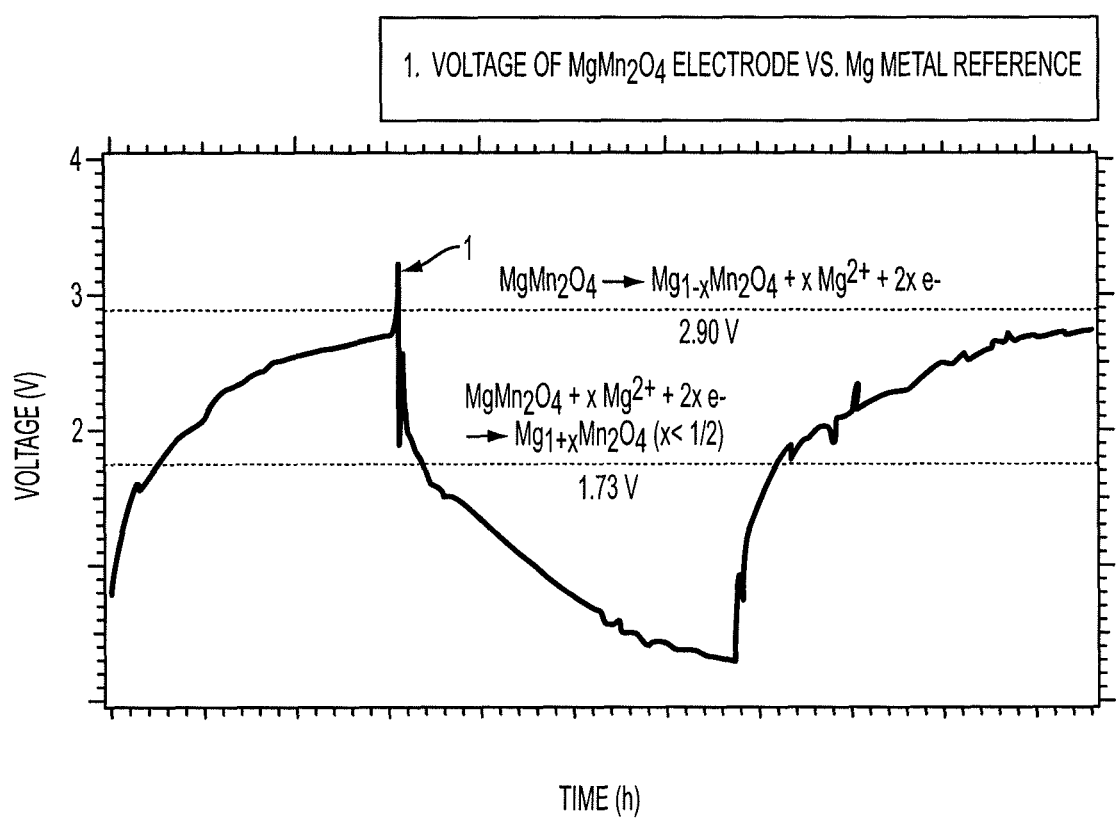
FIG. 2 is a voltage profile corresponding to $MgMn_2O_4$ spinel in a electrochemical test cell demonstrating the higher activity observed by electrochemically extracting Mg from the tetrahedral sites of $MgMn_2O_4$ spinel at high voltage, than when attempting to insert additional Mg into the spinel to form a rock salt related compound at low voltage.

Experimentally validation of a 3V magnesium cathode material is demonstrated in FIGS. 1 and 2. FIG. 1 is a series of XRD spectra which show the chemical Mg removal and electrochemical reinsertion of Mg from the $MgMn_2O_4$ phase. FIG. 2 shows the initial charge/discharge testing of tetragonal spinel $MgMn_2O_4$. From these data it is clear that electrochemical removal of magnesium from the spinel (reaction [1]) initiates at about 2.7 V. There is a change in slope occurring at ~1.7 V, which is the calculated voltage for magnesium insertion into $MgMn_2O_4$. The calculations indicate that this phase exhibits significantly higher diffusion barriers during the low voltage reaction [2] thus explaining the minimal capacity observed within that region by us and Kurihawa et. al. experiments. Consequently, the spinel materials described within this application target those capable of the Mg extraction reaction described by equation [1].

In certain embodiments, the spinel compounds are oxides containing one or more metals selected from the group consisting of Cr, V, Fe, Co, Ni, Mn, and mixtures thereof, as the transition metals. Non-limiting examples include $MgCr_2O_4$, $MgV_2O_4$, $MgFe_2O_4$, $MgMg_5V_4O_{12}$, $MgCo_2O_4$, $MgMn_2O_4$, $MgNi_2O_4$, $MgCrVO_4$, $MgCrCoO_4$, $MgNiMnO_4$, $MgCoMnO_4$, $MgMnVO_4$, $MgFeNiO_4$, $MgCrNiO_4$, $MgNiVO_4$, $MgCoVO_4$, $Mg_3FeV_5O_{12}$, $Mg_3MnV_5O_{12}$, $Mg_2CrV_3O_8$, $Mg_2VCr_3O_8$, $Mg_2FeV_3O_8$, $Mg_2VFe_3O_8$, $Mg_3CrV_5O_{12}$, $Mg_3Fe_2V_4O_{12}$, $Mg_3Fe_1V_5O_{12}$, $Mg_3V_1Mn_5O_{12}$, $Mg_3Cr_2V_4O_{12}$, $Mg_3V_2Fe_4O_{12}$, $Mg_3Cr_1V_5O_{12}$, $Mg_3Cr_4V_2O_{12}$, $MgFeVO_4$, $MgNiVO_4$, $Mg_3Ni_2V_4O_{12}$, $Mg_2MnV_3O_8$, $Mg_3Co_2V_4O_{12}$, $Mg_2NiMn_3O_8$, $Mg_3Ni_1Mn_5O_{12}$, $Mg_3Ni_2Mn_4O_{12}$, $Mg_2NiFe_3O_8$, $Mg_3Ni_1Fe_5O_{12}$, $Mg_3Ni_2Fe_4O_{12}$, $Mg_3Ni_1Cr_5O_{12}$, $Mg_2NiCr_3O_8$, $Mg_3Ni_2Cr_4O_{12}$. In other embodiments, the spinel compounds includes spinel compounds of sulfides and selenides containing one or more metals selected from the group consisting of Zr, V, Mn, Cr, and mixtures thereof. Non-limiting examples include $MgZr_2S_4$, $MgZr_2Se_4$, $MgV_2S_4$, $MgV_2Se_4$, $MgCr_2S_4$, $MgCr_2Se_4$, $MgMn_2S_4$, $MgMn_2Se_4$, $MgCrVS_4$, $MgCrVSe_4$. In some embodiments, these materials are used as cathode active materials. In other embodiments, these materials provide lower voltage (~0.25 V to ~2.5 V vs. Mg/Mg$^{2+}$) and are used as magnesium insertion anode active materials.

Spinel materials may be synthesized through a variety of methods. In some embodiments, spinel materials may be synthesized by solid state synthesis in which MgO or $Mg(OH)_2$ is reacted with a manganese oxide such as $Mn_2O_3$ to create $MgMn_2O_4$. Another route of synthesis involves co-precipitation of the above reactions from solution (e.g. aqueous) in order to obtain a finely divided mixture for subsequent heating. In other embodiments, these materials are synthesized by two-step reaction wherein a non-Mg divalent metal is first reacted with a binary compound of the transition metal to form an intermediate compound with the spinel structure and the preferred ordering of the non-Mg divalent metal in the tetrahedral sites. The second step consists of removal of the placeholder non-Mg divalent cation and magnesium insertion. For example $ZnC_2O_4 \cdot 2H_2O + V_2O_5 + C \rightarrow ZnV_2O_4 + 2CO_2 + CO + 2H_2O$ followed by Zn extraction, and then Mg insertion to form $MgV_2O_4$. In some embodiments, compounds that can be utilized as intermediates for the two-step reaction include $CuMn_2O_4$, $CuFe_2O_4$, $ZnCr_2O_4$, $ZnFe_2O_4$.

In some embodiments, $MgCr_2S_4$ spinel and sulfide spinels including Zr, V, Mn, and Cr, or mixtures thereof are synthesized in a single step by reacting MgS and a binary transition metal sulfide under conditions of solid state synthesis, e.g., $MgS + Cr_2S_3 \rightarrow MgCr_2S_4$. In other embodiments, these materials are synthesized by two-step reaction wherein a non-Mg divalent metal sulfide is first reacted with a binary transition metal sulfide under solid state conditions, to form an intermediate compound with the spinel structure and the preferred ordering in which the non-Mg divalent metal occupies the tetrahedral site. The second step consists of removal of the placeholder non-Mg divalent cation and subsequent magnesium insertion. In some specific embodiments, the solid state reaction of $CuS + Cr_2S_3 \rightarrow CuCr_2S_4$ is followed by chemical or electrochemical Cu extraction, and then Mg insertion to form $MgCr_2S_4$. Non-limiting examples of intermediate compounds for the two-step reaction include: $CuV_2S_4$, $ZnCr_2S_4$, $CuCo_2S_4$, $CuZr_2S_4$, $CuCr_2S_4$.

In another aspect, a compound of formula $A_{b'}Mg_aM_b(XO_z)_y$ for use as electrode material in a magnesium battery is described, wherein A is one or more dopants selected from the group consisting of Al, Li, Na, K, Zn, Ag, Cu, and mixtures thereof;

M is one or more transition metals selected from the group consisting of Ti, V, Cr, Mn, Fe, Co, Ni, Cu, Zr, Nb, Mo, Sn, Sb, Bi, Ta, W, and mixtures thereof;

X is one or more anions selected from the group consisting of P, V, Si, B, C, As, S, N, and mixtures thereof;

0.9≤b'≤3.9;
0≤a≤3.1;
0.9≤b≤3.9;
0.9≤y≤3.9;
1.9≤z≤3.9; and the compound has an olivine structure or a NASICON structure, or the compound is isostructural with the $LiVP_2O_7$ structure or the vanadium oxy-phosphate $VO(PO_4)$ structure;

provided that the compound is not $Mg_aMnSiO_4$ or $Mg_{0.5}Ti_2(PO_4)_3$.

In some embodiments, "M" is a metal cation such as Ti, V, Cr, Mn, Fe, Co, Ni, Cu, Zr, Nb, Mo, Sn, Sb, Bi, Ta, or W and "X" in a non-metal cation such as carbon (C), boron (B), phosphorous (P), silicon (Si), sulfur (S), nitrogen (N), arsenic (As). In some embodiments, the compound comprises a polyanion "$XO_z$". In some embodiments, the compound has an olivine structure. In other embodiments, the compound has a NASICON structure. The materials can have an olivine-type structure, a NASICON type structure, diphosphate-type structure, or vanadium oxy-phosphate type structure.

In some embodiments, b' is 0 and the compound ahs a formula of $Mg_aM_b(XO_z)_y$.

In some embodiments, the compound is in an oxidized state and a is about 0. In some embodiments, the compound is in a reduced state and a is about 2. In some embodiments, b is about 1 and y is about 2. In other embodiments, b is about 2 and y is about 3.9.

In certain embodiments, b' is in the range of $0.05 \le b' \le 2.9$. In certain embodiments, b' is in the range of $0.05 \le b' \le 2.0$. In certain embodiments, b' is in the range of $0.05 \le b' \le 1.5$. In certain embodiments, b' is in the range of $0.05 \le b' \le 1.0$. In certain embodiments, b' is in the range of $0.1 \le b' \le 2.0$. In certain embodiments, b' is in the range of $0.2 \le b' \le 1.5$. In certain embodiments, a is in the range of $0 \le a \le 2$. In certain embodiments, a is in the range of $0.5 \le a \le 1.5$. In certain embodiments, a is in the range of $0.75 \le a \le 1.25$. In certain embodiments, b is in the range of $0.5 \le b \le 2$. In certain embodiments, b is in the range of $0.75 \le b \le 1.5$. In certain embodiments, b is in the range of $0.75 \le b \le 1.0$. In certain embodiments, a is in the range of $0.75 \le a \le 1.25$. In certain embodiments, y is in the range of $1.0 \le y \le 3.9$. In certain embodiments, y is in the range of $1.5 \le y \le 3.5$. In certain embodiments, y is in the range of $2.0 \le y \le 3.0$. In certain embodiments, y is in the range of $3 \le y \le 3.5$. In certain embodiments, y is in the range of $1.0 \le y \le 2.0$. In certain embodiments, z is in the range of $2.0 \le y \le 3.9$. In certain embodiments, y is in the range of $2.5 \le z \le 3.5$. In certain embodiments, y is in the range of $2.5 \le z \le 3.0$. In certain embodiments, y is in the range of $3 \le z \le 3.5$. All ranges of a, b, b', z, and y can be combined with any of the recited ranges for a, b, b', z, and y.

In some embodiments, $0 \le a \le 2$, b is about 1, y is about 1, and $3 \le z \le 3.9$. In other embodiments, $0 \le a \le 3$, b is about 2, y is about 3, and $3 \le z \le 3.9$. In still other embodiments, $0 \le a \le 1.53$, b is about 0.5, y is about 1, and $3 \le z \le 3.9$.

In some embodiments, the compound described herein is isostructural with an olivine $LiFePO_4$, in which the "Li" site is fully or partially occupied by magnesium, the "Fe" site is occupied by a transition metal, and the "P" site is occupied by a cation. Batteries containing magnesium anodes and cathodes comprising of these materials should have energy density and specific energy similar to or greater than commercial lithium-ion batteries.

In some embodiments, compounds with specific olivine, NASICON, diphosphate-type structures, or vanadium oxy-phosphate type structures suitable for use as electroactive materials in magnesium batteries are disclosed.

In certain embodiments, the magnesium battery materials or compounds is isostructural with an olivine $LiFePO_4$, which contains Mn, Fe, Co, Ni, Cr, Cu, or mixtures thereof on the "Fe" site and P, As, Si, V, or S on the "P" site. Non-limiting examples of such material or compound include $MgFe_2(PO_4)_2$, $MgCr_2(PO_4)_2$, $MgMn_2(PO_4)_2$, $Mg_2Mn(PO_4)_2$, $Mg_3Fe_3(PO_4)_4$, $MgCO_2(PO_4)_2$, $Mg_3Co_3(PO_4)_4$, $MgNi_2(PO_4)_2$, $MgMnFe(PO_4)_2$, $MgMnCo_2(PO_4)_2$. An olivine structured material can be synthesized through a variety of methods, such as by chemically or electrochemically removing $Li^+$ from $LiFePO_4$ and then reacting the resulting material $FePO_4$ with Mg. These methods enable proper site ordering of the Mg onto the Li sites. In other embodiments, the material is prepared by direct solid state synthesis from Mg-containing precursors.

In certain embodiments, the magnesium materials can have either rhombohedral or monoclinic NASICON ($Na_3Zr_2Si_2PO_{12}$) structures, where the "Zr" site is at least partially occupied by a transition metal Ti, V, Cr, Mn, Fe, Co, Ni, Cu, Zr, Nb, Mo, Sn, Sb, the "Si" and "P" sites are occupied by Al, P, Si, V, or As, and the "O" site is occupied by O. Magnesium may be located at a number of low-energy "Na" sites throughout the material. Exemplary materials include $Mg_{0.5}V_2(PO_4)_3$, $MgV_2(PO_4)_3$, $Mg_{0.5}Ti_2(PO_4)_3$, $Mg_{1.5}Cr_2(PO_4)_3$. In some embodiments, the compounds as described herein has a unit cell atomic arrangement isostructural with a monoclinic or rhombohedral NASICON unit cell.

In certain embodiments, the material is isostructural with the $LiVP_2O_7$ structure, where the "Li" site is fully or partially occupied by magnesium, the "V" site is fully or partially occupied by a transition metal, the "P" site is occupied by "P", and the "O" site is occupied by "O". In particular embodiments, the $LiVP_2O_7$-based structure includes one or more of Ti, V, Cr, Mn, Fe, Mo, or mixtures thereof on the "V" site.

In certain embodiments, the material is isostructural with vanadium oxy-phosphate $VO(PO_4)$ structure. $VO(PO_4)$ is a known oxy-phosphate that occurs in several polymorphic structures (alpha, beta, delta, omega, epsilon, gamma), as both the hydrated and dehydrated forms. In some embodiments, the material is isostructural with the hydrated and dehydrated forms of alpha, beta, delta, omega, epsilon, gamma $VOPO_4$ compounds. In some specific embodiments, the compound has a structure displaying electrochemical properties and Mg mobility and are used as an Mg insertion electrode. Among the vanadium oxy-phosphate compounds, the beta form of $VOPO_4$ displays excellent stability upon magnesium insertion and removal and excellent capacity, up to one magnesium ion per vanadium atom. In some embodiments, the compound has a unit cell atomic arrangement isostructural with a beta-$VOPO_4$ unit cell. In some embodiments, the compound is beta-$VOPO_4$.

In yet another embodiment, magnesium can be chemically or electrochemically inserted into metal diphosphate compounds with the cubic $TiP_2O_7$ structure. Non-limiting examples include $TiP_2O_7$ and $MoP_2O_7$. Compounds with the $VP_2O_7$ structure, such as $VP_2O_7$, can also insert magnesium though at a moderately slower rate than the cubic diphosphates. Other compounds contemplated within the diphosphate class include $Mg_{0.5}TiP_2O_7$, $Mg_{0.5}VP_2O_7$, $Mg_{0.5}CrP_2O_7$, $Mg_{0.5}MoP_2O_7$, $Mg_1CrP_2O_7$, $Mg_1MnP_2O_7$, $Mg_1CoP_2O_7$, $Mg_1NiP_2O_7$. In some embodiments, the compound has a unit cell atomic arrangement isostructural with a cubic diphosphate $TiP_2O_7$ unit cell.

In some specific embodiments, the compound is olivine $MgFe_2(PO_4)_2$. In other specific embodiments, X is P. In still other specific embodiments, the compound is NASICON $MgFe_2(PO_4)_3$ or $MgV_2(PO_4)_3$.

In some embodiments, b' is not 0 and the dopant A partially substitute for the transition metals to enhance the performance or cost of the electrode material. Batteries containing magnesium anodes and cathodes comprising of these materials have also higher theoretical energy density and specific energy than current commercial lithium-ion batteries, specified by a carbonaceous insertion anode.

Synthetic Methods

In yet another aspect, the method of synthesizing a compound as described herein is disclosed, using solid state synthesis, co-precipitation, or carbothermal reduction from magnesium containing precursor, wherein the magnesium containing precursor is one or more compounds selected from the group consisting of MgO, Mg(OH)$_2$, MgCO$_3$, MgSO$_4$, MgS, MgF$_2$, MgHPO$_4$, Mg metal, and mixtures thereof.

In some embodiments, the materials described herein as Mg electrode materials by general formulas layered Mg$_a$M$_b$X$_y$, spinel Mg$_a$M$_b$X$_y$, and polyanion Mg$_a$M$_b$(XO$_z$)$_y$, are prepared directly from Mg-containing precursors (oxide, hydroxide, carbonate, oxalate, sulfate, etc.) by means of either solid state reaction, co-precipitation from solution, or carbothermal reduction of solid precursors. For example, MgMn$_2$O$_4$ spinel can be directly synthesized using ceramic methods such as solid-state reaction of 1MgO (0.403 g) and 2Mn$_2$O$_3$ (1.58 g). The powders are first mixed with mortar and pestle, or preferably with shaker or planetary milling to enable thorough dispersion of the precursors. Subsequently, the sample is heated as a powder, or preferably first pelletized to facilitate solid state diffusion, then heated in air, nitrogen, or argon gas, at temperatures of 500 to 700° C. The above reaction conditions also enable the use of other Mg-precursors such as Mg(OH)$_2$+Mn$_2$O$_3$ to form MgMn$_2$O$_4$ and H$_2$O vapor. In other embodiments, the electrode material MgMn$_2$O$_4$ is directly synthesized using co-precipitation from aqueous solution in order to obtain small particle size. In some embodiments, MgSO$_4$ and MnSO$_4$*H$_2$O are dissolved in a 1 to 2 molar ratio in water to create about 1 M total solution of the precursors while bubbling nitrogen gas through the solution. To that, ~4.5 mols NaOH in concentrated aqueous solution (~2.5 M solution) add dropwise, all while bubbling air through the solutions, so as to produce hydroxides. Subsequently the precipitates are collected on filter paper and washed with de-ionized water, followed by drying at 50 to 100° C. (preferably 70° C.) in air. Thereafter it is possible to grow the crystal grains by annealing the sample between 300° C. and 700° C.

In some embodiments, during the synthesis of Mg-containing spinel materials as described above MgO can sometimes be obtained as an impurity phase (whether synthesizing oxides or sulfides etc.), which can be quite electronically and ionically insulating. A further method of making the magnesium spinel materials seeks to avoid or reduce the MgO formation. A method of preparing spinel materials for Mg insertion first requires synthesis of the Cu, Zn, Ag, Li, Na, K, or Ca form of the material, and then extracts the Cu, Zn, Ag, Li, Na, K, or Ca from the material (both by electrochemical charging in an electrode of a Mg or Li cell, or by chemical extraction by acid or oxidizer) and replacing it with Mg by chemical or electrochemical means. In some embodiments, ZnMn$_2$O$_4$ is synthesized using co-precipitation from aqueous solution of ZnSO$_4$ and MnSO$_4$*H$_2$O, and then Zn is extracted from by means of nitric acid so as to avoid MgO formation. In other embodiments, solid state reaction is used. In some specific embodiments, CuS and Cr$_2$S$_3$ are reacted under inert atmosphere, or sealed ampoule up to temperature between 600° to 1000° C. to form CuCr$_2$S$_4$ spinel. Subsequently Cu is chemically or electrochemically removed, and Mg is chemically or electrochemically reinserted.

In some embodiments, a method of synthesizing a compound described herein is disclosed, wherein a precursor containing one or more metals selected from the group consisting of Cu, Zn, Ag, Na, K, Rb, Cd, Ca, Sr, Ba, and a combination thereof is used; and the Cu, Zn, Ag, Na, K, Rb, Cd, Ca, Sr, or Ba in the precursor is chemically or electrochemically extracted and replaced with Mg by chemical or electrochemical insertion. In some specific embodiments, the preparation of the above layered or spinel materials is accomplished using the two-step sequence in which an intermediate compound is synthesized with Na, K, Li, Cu, Ag, Zn, Ca occupying the place of Mg in the tetrahedral spinel site, or the octahedral site of the Mg layer in layered materials. Subsequently, the place-holding cation (Na, K, Li, Cu, Ag, Zn, Ca) from the tetrahedral site of the spinel, or the octahedral site of the Mg layer in layered materials, can be chemically extracted by immersing the intermediate phase in a chemical oxidant or acidic solution (e.g. pH=~1 HCl) for between 6-24 h at room temperature with stirring. Subsequently, the sample is washed with deionized water, dried at room temperature and reduced pressure ($10^{-3}$ Torr), or dried at 60° C. to 120° C. under ambient or reduced pressure ($10^{-3}$ Torr). Mg ions are then inserted into the vacant tetrahedral site first by preparing an electrode containing the spinel material, a conductive carbon (e.g. Super P), and binder (e.g. PVdF) which is placed in an electrochemical cell with Mg metal anode, Mg alloy anode, or lower voltage Mg-containing insertion material, and an Mg-conducting electrolyte. Subsequent discharge corresponds to Mg insertion into the now vacant tetrahedral site of the spinel structure, or the vacant Mg octahedral site of layered materials, thus enabling high Mg diffusion into the host structure. Alternatively Mg ions are inserted into the now vacant tetrahedral site of the spinel structure, or the vacant Mg octahedral site of layered materials, by chemical insertion resulting from immersion of the sample in a solution of 300% excess di-butyl magnesium in heptane and stirring at temperatures between 20° C. to 40° C. for 5 days to 2 weeks.

In other embodiments, an electroactive Mg layered or spinel material is synthesized. In these specific embodiments, the intermediate compound having Na, K, Li, Cu, Ag, Zn, Ca or mixtures thereof occupying the place of Mg in the tetrahedral spinel site or the octahedral Mg site of the layered materials are used as electrode active material in an electrode in cell. The electrode also comprises conductive carbon black, and PVdF binder. The cell comprises additionally a non-aqueous Li-ion conducting electrolyte, and Li metal anode. The cell is galvanostatically charged to a voltage that ensures extraction of the place-holding cation (e.g. 4.3 V vs. Li LiMn$_2$O$_4$) and potentiostatically held at the same voltage for about 10 h, or until the charge capacity is between about 80% and 100% of the theoretical value (e.g. 125 mAh/g and 150 mAh/g for LiMn$_2$O$_4$). At this point the cell is dismantled, and the remaining Mn$_2$O$_4$ cathode is washed with dimethyl carbonate or di-ethyl carbonate to remove residual Li salt. Subsequently the electrode is dried at either room temperature and reduced pressure ($10^{-3}$ Torr) or 60° to 120° C. under ambient or reduced pressure ($10^{-3}$ Torr). Mg ions can be inserted into the now vacant tetrahedral site of the spinel structure, or the vacant Mg octahedral site of layered materials, thus enabling high Mg diffusion into the host structure. by placing that electrode in an electrochemical cell with Mg metal anode, Mg alloy anode, or lower voltage Mg-containing insertion material, and an Mg-conducting electrolyte. Subsequent discharge corresponds to Mg insertion into the now vacant tetrahedral site of the spinel structure, or the vacant Mg octahedral site of layered materials, thus enabling high Mg diffusion into the host structure. Alternatively Mg ions can be inserted into the now vacant tetrahedral site of the spinel structure, or the vacant Mg octahedral site of layered materials, by chemically inserting Mg ions by immersing the sample in a solution of 300% excess di-butyl magnesium in heptane and stirring at temperatures between 20° to 40° C. for 5 days to 2 weeks.

In some embodiments, a variety of Mg-containing polyanion electrode materials are prepared from direct synthesis of Mg-containing precursors. In other embodiments, the Mg-containing polyanion electrode materials are synthesized using a the two-step sequence in which an intermediate compound is synthesized with Cu, Zn, Ag, Li, Na, K, or Ca occupying the Mg site. Subsequently the place-holding cation (i.e. Cu, Zn, Ag, Li, Na, K, or Ca) is chemically or electrochemically removed, and Mg is chemically or electrochemically inserted into the now vacant site. In some embodiments, olivines, or other polyanions, formed from divalent Mg and a divalent transition metal will form with high degree of mixing between the intended Mg-site and the divalent transition metal site due to the isovalent nature of the cations. Such mixing can significantly inhibit Mg diffusion within the host structure. For example the work of Nuli et al. on Mg insertion into $Mg_{1.03}Mn_{0.97}SiO_4$ demonstrates that appreciable site disorder (8-11% in their work) limits them to obtaining less than ½ of the theoretical capacity for this material. The use of monovalent Li, Na, K, Cu, Ag, to induce separation of the cations into separate lattice sites, can reduce such issues. In general, the isovalent mixing may occur to a greater degree when using Mg-containing precursors to prepare olivines of $Mg^{2+}$, $M^{2+}$, and $(SiO_4)^{2-}$ than when preparing other oxy-anions materials (e.g. phosphates, arsenates, sulfates).

Similarly, the NASICON structure of $Mg_{0.5}Ti_2(PO_4)_3$ studied by Makino et al. J Power Sources 112, 85-89, 2002) demonstrates subtle change in the lattice parameter (and therefore unit cell volume) when preparing the material with substitution of Ti with Fe or Cr, which corresponds with limited Mg migration due to Mg trapping in some lattice sites. In some embodiments, certain NASICON materials display more preferable lattice parameters when prepared via the two-step reaction sequence described herein, which requires the intermediate synthesis of Li, Na, K, Cu, Zn, Ag, compounds with these place-holding cations occupying the Mg site. Subsequently the place-holding cation is chemically or electrochemically removed and Mg is chemically or electrochemically inserted as described in the previous paragraphs. In some specific embodiments, Li-titanium NASICON displays slightly larger cell volume than the Mg-titanium NASICON (226.27 $Å^3$ for $Li_1Ti_2(PO_4)_3$ vs. 225.86 for $Mg_{0.5}Ti_2(PO_4)_3$). Accordingly, the Li-compound is prepared, then Li is replaced with Mg, resulting in compounds with more favorable Mg mobility than the directly synthesized Mg-compound. In an opposing example, the Mg-vanadium NASICON, which has not been previously reported for use as an Mg insertion electrode, displays slightly larger unit cell volume when preparing it directly from Mg-containing precursors than Li-containing precursors (217.50 $Å^3$ for $Li_1V_2(PO_4)_3$ vs. 221.79 for $Mg_{0.5}V_2(PO_4)_3$), which indicates to us that direct synthesis from Mg-containing precursors rather than Li (or one of the other secondary preferable cations) should not lead to significant differences in the Mg mobility.

Methods to Prepare a Magnesium Ion Battery

In yet another aspect, an electrode for a magnesium battery is described, comprising a compound of formula $A_bMg_aM_bX_y$ or $A_bMg_aM_b(XO_z)_y$ as described herein. In some embodiments, the compound of formula $A_bMg_aM_bX_y$ is not layered $VS_2$, spinel $Co_3O_4$, layered $V_2O_5$, rocksalt MnO, spinel $Mn_2O_4$, spinel $Mn_3O_4$, or layered $ZrS_2$. In some embodiments, the compound of formula $A_bMg_aM_b(XO_z)_y$ is not $Mg_aMnSiO_4$ or $Mg_{0.5}Ti_2(PO_4)_3$. In some embodiments, these compounds are used as cathode active material. In some embodiments, these compounds are used as anode active material. In some embodiments, the compound has a layered structure. In other embodiments, the compound has a spinel structure.

In some embodiments, the electrode further comprises an electronically conductive additive. Non-limiting examples of electronically conductive additive include carbon black. In some embodiments, the electrode further comprises a binder. Non-limiting examples of binder include polyvinylidene fluoride, polytetrafluoroethylene, and terpolymer or copolymer thereof.

In some embodiments, an Mg-metal or Mg alloy is used as an anode which results in significant gains in volumetric and gravimetric energy density compared to lithium-insertion anodes. While gravimetric energy content is important for electrical vehicle applications, volumetric considerations have been an even larger concern for large battery packs and small battery packs for portable electronics. The high capacity of magnesium and the use of Mg-metal, or Mg alloy, anodes can provide energy densities approaching 1600 Wh/l, which would make magnesium batteries one of the highest energy density technologies available. Furthermore, the ready availability of magnesium from a variety of raw materials sources can significantly lower cost of production.

A non-aqueous electrolyte solution is prepared by dissolving a magnesium salt in an appropriate solvent. Exemplary magnesium salts include $MgCl_2$, $Mg(ClO_4)_2$, $Mg(SO_2CF_3)_2$, $Mg(BF_4)_2$, $Mg(CF_3SO_3)_2$, and $Mg(PF_6)_2$. Exemplary non-aqueous solvents include propylene carbonate, ethylene carbonate, butylene carbonate, vinylene carbonate, gamma-butyl lactone, sulfolane, 1,2-dimethoxyethane, 1,2-diethoxyethane, 2-methyltetrahydrofuran, 3-methyl-1,3-dioxolane, methyl propionate, methyl butyrate, dimethyl carbonate, diethyl carbonate and dipropyl carbonate. The foregoing nonaqueous solvent may be employed solely or a plurality of materials may be mixed. It is preferable that cyclic carbonate or chain carbonate is employed from a viewpoint of realizing electric stability. In other cases the non-aqueous electrolyte solution may be composed wholly or in part of an organo-Magnesium complex solution. Such solutions consist of a Grignard compound, composed of Magnesium coordinated to both an organic ligand and a halide dissolved in one of the exemplary solvents described above. Some exemplary examples of the organic ligands include alkyl, aryl, alkenyl, heteroaryl, or n-dibutyl groups, and the halides include F, Cl, Br, I. In some cases such a compound is also complexed with a strong Lewis Acid such as $AlBr_3$, $AlCl_3$, $BCl_3$, $BF_3$, $FeCl_3$, $FeBr_3$, $TiCl_4$, $SnCl_4$, in one of the exemplary solvents described above.

In yet another aspect, an energy-storing device is described, comprising:

a first positive electrode comprising the compound of formula $Mg_aM_bX_y$ or $Mg_aM_b(XO_z)_y$ as described herein; and a second electrode electrode comprising a magnesium metal, a magnesium alloy, or the compound of formula $Mg_aM_bX_y$ or $Mg_aM_b(XO_z)_y$ as described herein.

In some embodiments, the energy-storing device is a Mg battery. In some specific embodiments, the Mg battery can be prepared as follows. A suitable Mg cathode material selected from the materials describe herein is combined with a conductive materials such as carbon black, graphite or other conductive carbon and a binder to generate a uniform mixture. The positive electrode is pressed and/or molded into a desired shaper or is extruded onto a current collector.

The negative electrode, typically Mg metal, Mg alloy, or a second electrode selected from the materials describe herein, and the positive electrode are positioned on opposite sides of a separator typically constituted by a porous film made of polypropylene in a battery can. The non-aqueous electrolytic solution is introduced into the battery can and is sealed, for example, by crimping.

In some embodiments, the negative electrode and the positive electrode are again accommodated in the battery cell, which can take on a variety of standard forms including, but not limited to cans, stacks, laminates, rolls, etc. Then the separator is disposed between the negative electrode and the positive electrode and, new non-aqueous electrolytic solution is introduced into the battery cell and the can is crimped to close.

EXAMPLE 1

Tables 1 and 2 of Ab Initio Results for Target Materials

Tables 1 and 2 summarize the composition, structure, and calculated properties for a number of magnesium containing compounds. The compounds exhibit the structure and composition necessary to provide reasonable reaction voltage and Magnesium mobility as computed using a density functional theory framework using the Generalized Gradient Approximation (GGA) with or without a Hubbard correction term (GGA+U), depending on the chemistry involved. The mobility barriers provided in Tables 1 and 2 refer to the minimum activation barrier for an $Mg^{2+}$ ion to traverse the entire compound unit cell. An activation barrier is defined as the difference in energy between two distinct Mg crystallographic sites and is computed by elastic band calculations. A detailed description of the method and its accuracy can be found in [G. Mills, H. Jonsson, and G. K. Schenter, Surf. Sci. 324, 305, 1995.]. Materials with barriers <800 meV correspond to materials predicted to exhibit useful rates of topotatic Mg insertion and removal. Furthermore, consider a Mg insertion reaction with a cathode compound of the formula $M_bX_y$ in the de-magged state:

$$M_bX_y + aMg \Rightarrow Mg_aM_bX_y \quad [3]$$

The average voltage in a Mg insertion reaction is computed by ground state relaxation calculations of the starting compound state ($M_bX_y$), the inserted compound state ($Mg_aM_bX_y$) and the Mg metal state. The voltage (as given in the table in Tables 1 and 2) can then be computed according to the following formula:

$$V = (E(Mg_aM_bX_y) - E(M_bX_y))/(aE(Mg)) \quad [4]$$

where E denotes the ground state total energy as computed by density functional theory methods [M. K. Aydinol, A. F. Kohan, and G. Ceder in *Ab Initio Calculation of the Intercalation Voltage of Lithium Transition Metal Oxide Electrodes for Rechargeable Batteries*, Elsevier Science Sa, New York, 1997, pp. 664-668.]. The voltages correspond to a range of about 0.5 V vs. Mg to 3.75 V vs. Mg thus illustrating that the variety of materials comes from multiple categories of materials; classified here as polyanion, layered, and spinel compounds. The accuracy of the predictive methods has been validated in numerous publications, such as Zhou et al [F. Zhou, M. Cococcioni, C. A. Marianetti, D. Morgan, G. Ceder, Physical Review, B 70 (2004) 235121] and Jain et al [Jain et al, Computational Materials Science, 50, 2295-2310, 2011].

Table 2 illustrates a comparison of the mobility barriers for $Mg^{2+}$ and $Li^+$ for several compounds. As Table 2 shows, there exists a non-trivial relationship between the size and valence of the moving ion and the structure and chemistry of the host compound, which determines the ionic mobility of the specific ion in that compound. Specifically, the result in Table 2 shows that one cannot expect an ionic cathode material with good $Li^+$ diffusivity to automatically exhibit good $Mg^{2+}$ diffusivity. Conversely, there may be compounds with sluggish $Li^+$ diffusivity which exhibit good $Mg^{2+}$ diffusivity.

TABLE 1

Mg insertion compounds with assigned properties calculated by ab initio methods

| Count | De-Magged Composition | Category | Ab initio barrier | Average Reaction Voltage vs. Mg |
|---|---|---|---|---|
| 1 | FeCl₃ | Layered | 619 | 2.34 (1e−) |
| 2 | V₂(PO₄)₃ NASICON Trigonal | Polyanion | 536 | 2.63 (3e−) |
| 3 | Cr₂S₄ | Spinel | 553 | 1.67 (2e−) |
| 4 | Mn₂O₄ | Spinel | 575 | 2.90 (2e−) |
| 5 | CrS₂ | Layered | 788 | 1.51 (2e−) |
| 6 | FePO₄ Olivine | Polyanion | 608 | 2.66 (1e−) |
| 7 | Ni₂O₄ | Spinel | 626 | 3.52 (2e−) |
| 8 | CrMo(PO₄)₃ NASICON Trigonal | Polyanion | 591 | 2.42 (3e−) |
| 9 | CoO₂ | Layered | 674 | 3.18 (0.5e−) |
| 10 | Mo₂(PO₄)₃ NASICON Monoclinc | Polyanion | 844 | 2.21 (3e−) |
| 11 | MoPO₄ | Polyanion | 853 | 2.16 (2e−) |
| 12 | (CoMn)O₄ | Spinel | 938 | 2.54 (2e−) |
| 13 | TiP₂O₇ | Polyanion | 449 | 0.61 (1e−) |
| 14 | VS₂ Spinel | Spinel | 497 | 0.94 (2e−) |
| 15 | V₂O₄ Spinel | Spinel | 504 | 2.25 (2e−) |
| 16 | TiO₂ Anatase | Anatase | 547 | 0.67 (1e−) |
| 17 | Alpha-VOPO₄ | Polyanion | 548 | 2.37 (2e−) |
| 18 | V₁₈O₄₄ | Pseudo-Layered | 156 | 2.37 (12e−) |
| 19 | Beta-VOPO₄ | Pseudo-Layered | 774 | 2.58 (2e−) |
| 20 | FeOCl | Layered | 389 | 1.54 (1e−) |
| 21 | V₂O₅ (de-Magged MgV₂O₅) | Pseudo-Layered | 545 | 2.58 (2e−) |
| 22 | V₂O₅ (Common Ground State) | Pseudo-Layered | 564 | 2.43 (2e−) |

TABLE 2

Mg insertion compounds with assigned properties calculated by ab initio methods

| Count | De-Magged Composition | Category | Ab initio barrier (Mg) | Ab initio barrier (Li) | Average Reaction Voltage vs. Mg |
|---|---|---|---|---|---|
| 1 | FeCl₃ | Layered | 619 | 172 | 2.34 (1e−) |
| 2 | V₂(PO₄)₃ NASICON Trigonal | Polyanion | 536 | 614 | 2.63 (3e−) |
| 3 | Cr₂S₄ | Spinel | 553 | 380 | 1.67 (2e−) |
| 4 | Mn₂O₄ | Spinel | 575 | 227 | 2.90 (2e−) |
| 5 | CrS₂ | Layered | 788 | 392 | 1.51 (2e−) |
| 6 | FePO₄ Olivine | Polyanion | 608 | 237 | 2.66 (1e−) |
| 7 | Ni₂O₄ | Spinel | 626 | 415 | 3.52 (2e−) |
| 8 | CrMo(PO₄)₃ NASICON Trigonal | Polyanion | 591 | 409 | 2.42 (3e−) |
| 9 | CoO₂ | Layered | 674 | 580 | 3.18 (0.5e−) |
| 10 | Mo₂(PO₄)₃ NASICON Monoclinc | Polyanion | 844 | 293 | 2.21 (3e−) |
| 11 | MoPO₄ | Polyanion | 853 | 74 | 2.16 (2e−) |
| 12 | (CoMn)O₄ | Spinel | 938 | 585 | 2.54 (2e−) |
| 13 | TiP₂O₇ | Polyanion | 449 | 297 | 0.61 (1e−) |

TABLE 2-continued

Mg insertion compounds with assigned properties calculated by ab initio methods

| Count | De-Magged Composition | Category | Ab initio barrier (Mg) | Ab initio barrier (Li) | Average Reaction Voltage vs. Mg |
|---|---|---|---|---|---|
| 14 | VS$_2$ Spinel | Spinel | 497 | 228 | 0.94 (2e−) |
| 15 | V$_2$O$_4$ Spinel | Spinel | 504 | 504 | 2.25 (2e−) |
| 16 | TiO$_2$ Anatase | Anatase | 547 | 511 | 0.67 (1e−) |
| 17 | Alpha-VOPO$_4$ | Polyanion | 548 | 220 | 2.37 (2e−) |
| 18 | V$_{18}$O$_{44}$ | Pseudo-Layered | 156 | 95 | 2.37 (12e−) |
| 19 | Beta-VOPO$_4$ | Pseudo-Layered | 774 | 292 | 2.58 (2e−) |
| 20 | FeOCl | Layered | 389 | 677 | 1.54 (1e−) |
| 21 | V$_2$O$_5$ (de-Magged MgV$_2$O$_5$) | Pseudo-Layered | 545 | 194 | 2.58 (2e−) |
| 22 | V$_2$O$_5$ (Common Ground State) | Pseudo-Layered | 564 | 260 | 2.43 (2e−) |

EXAMPLE 2

Description of Spinel Synthesis

EXAMPLE 2a

Co-Precipitation Method of MgMn$_2$O$_4$ and MgNiMnO$_4$

This example demonstrates the synthesis of a high mobility compound with a low diffusive path for magnesium, a new synthetic method was developed which involved a co-precipitation of hydroxide salts, followed by a low temperature calcination process according to the following reactions.

$$MgSO_{4(aq)}+2MnSO_{4(aq)}+(excess)NaOH_{(aq)} \rightarrow Mg(OH)_2(s)+Mn(OH)_{2(s)}+Na_2SO_{4(aq)}(25°\,C.) \quad [5]$$

$$Mg(OH)_{2(s)}+2Mn(OH)_{2(s)} \rightarrow nano\text{-}MgMn_2O_4(300°\,C./8\,hr) \quad [6]$$

Figure 3:
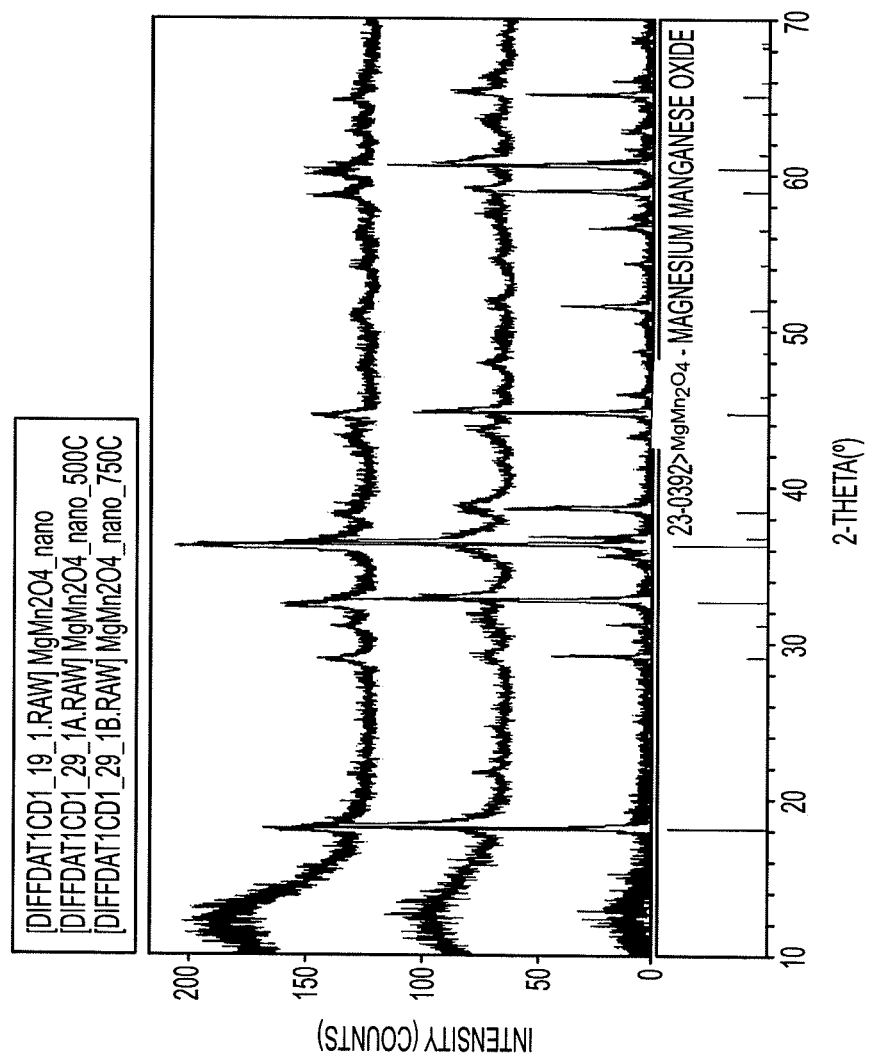
FIG. 3 depicts the X-ray diffraction spectra showing the progression of crystallinity of $MgMn_2O_4$ with various annealing temperatures (300° C.—top curve, 500° C.—middle curve, and 750° C.—bottom curve)

In a typical synthesis, 2.40 g of MgSO$_4$ and 6.75 g of MnSO$_4$.H$_2$O were dissolved in 100 ml of HPLC water at room temperature in a 500 ml Erlenmeyer flask. Subsequently, 200 ml of a 1M NaOH solution was slowly added dropwise over 15 minutes with continual stirring at room temperature. Immediately, a brown precipitant formed with the caustic addition and thus was critical to continually stir the solution during the addition to minimize agglomeration. Stirring of the solution and product at room temperature continued for 24 hours on a stir plate to ensure reaction completion. The brown precipitant was isolated by centrifugation (2000 rpm/15 min) and worked-up through several water rinses until the rinsate was neutral to pH paper. Then, the nano-MgMn$_2$O$_4$ powder was vacuum dried at 100° C. for 2 hours. Finally, the vacuum dried powder was annealed at several temperatures in a muffle furnace, namely 300° C., 500° C., and 750° C. in order to show the crystallization progression and purity of the sample. FIG. 3 depicts a resultant X-Ray diffraction spectrum from the synthetic route applied and confirms the method affords pure phase, nanocrystallite (20-25 nm) MgMn$_2$O$_4$ material. Similar synthetic methods involving co-precipitation of hydroxide salts to yield high mobility Mg compounds were created for other compounds described herein. For example, MgNiMnO$_4$ spinel is made in a similar fashion according to the following reactions:

$$MgSO_{4(aq)}+2MnSO_{4(aq)}+NiSO_{4(aq)}+xsNaOH_{(aq)} \rightarrow Mg(OH)_{2(s)}+Mn(OH)_{2(s)}+Ni(OH)_{2(s)}+Na_2SO_{4(aq)}(25°\,C.) \quad [7]$$

$$Mg(OH)_{2(s)}+Mn(OH)_{2(s)}+Ni(OH)_{2(s)} \rightarrow \text{``MgNiMnO}_4\text{''}-nano(300°\,C./6\,hr) \quad [8]$$

Figure 4:
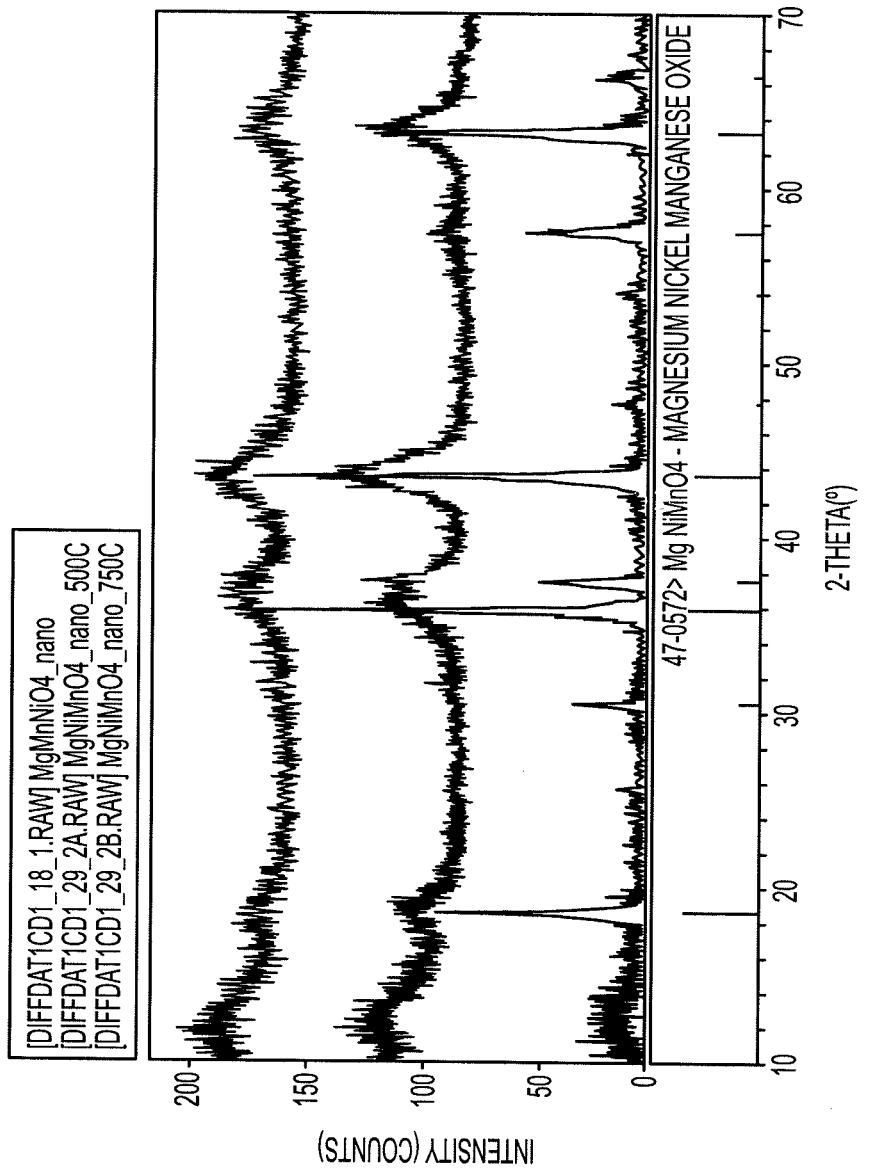
FIG. 4 shows the x-ray diffraction spectra showing the progression of crystallinity of $MgNiMnO_4$ with various annealing temperatures (330° C.—top curve, 500° C.—middle curve, and 750° C.—bottom curve).

Thereafter, confirmation of the intended compound, MgNiMnO$_4$ spinel, is exhibited in FIG. 4.

EXAMPLE 2b

Solid State Synthesis of ZnCr$_2$S$_4$

Spinels of other chemical classes have also been prepared for materials to be used in Mg electrode active materials. Zinc chromium sulphide was synthesized by solid state reaction methods using stoichiometric amounts of ZnS powder (0.655 g) and Cr$_2$S$_3$ (1.345 g) powder according to the following reaction:

$$ZnS+Cr_2S_3 \rightarrow ZnCr_2S_4\ 900°\,C./12\,hr/Argon/tube\ furnace \quad [9]$$

Figure 5:
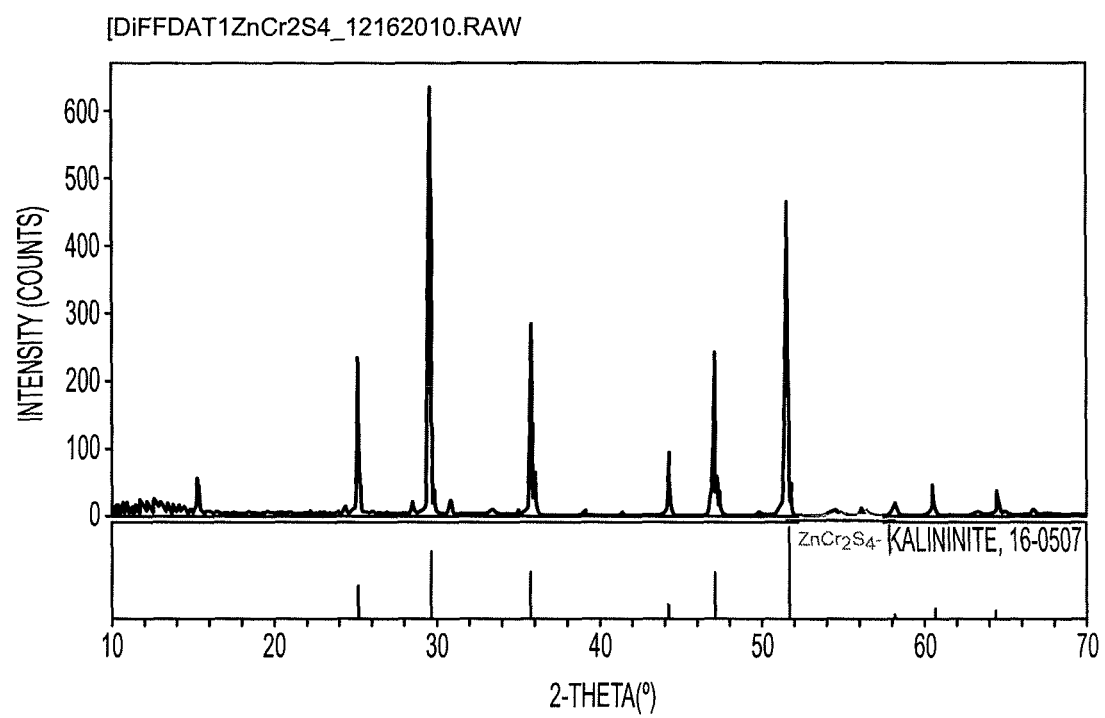
FIG. 5 depicts the characterization of $ZnCr_2S_4$ spinel by powder X-ray diffraction.

The mix was pelletized and placed in a tube furnace with flowing argon for 12 hours. XRD analysis showed the product to be relatively phase pure ZnCr$_2$S$_4$ (>95%) as demonstrated in FIG. 5. For those with expertise in the art, synthesis of a variety of high mobility spinel materials can be envisioned using such techniques.

EXAMPLE 3

Chemical De-Mag of MgMn$_2$O$_4$ (Magnesium Manganese Oxide Spinel), Electrochemical De-Mag of MgMn$_2$O$_4$ This example typifies the ability to prepare Mg containing compounds, and remove the Mg through chemical or electrochemical means in a topotactic fashion. FIG. 1 is an X-ray diffraction (XRD) spectra of MgMn$_2$O$_4$ spinel demonstrating (1) chemical Mg extraction and (2) subsequent electrochemical magnesium insertion according to one or more embodiments. This is the X-Ray diffraction spectra corresponding to a sample of MgMn$_2$O$_4$ spinel, which was synthesized, then immersed in acid to remove Mg. Following that the sample was placed in an electrochemical test cell to electrochemically reinsert Mg. FIG. 2 is a voltage profile corresponding to MgMn$_2$O$_4$ spinel in a electrochemical test cell demonstrating the higher activity observed by electrochemically extracting Mg from the tetrahedral sites of MgMn$_2$O$_4$ spinel at high voltage, than when attempting to insert additional Mg into the spinel to form a rock salt related compound at low voltage.

EXAMPLE 4

Synthesis of Polyanions: Lithium Iron Phosphate (LFP) to Chemically De-Lithiated LFP Lithium Iron phosphate was prepared according to two step reaction as detailed in equations 5,6:

$$Li_2CO_3+Fe(C_2O_4).2H_2O+NH_4H_2PO_4 \rightarrow \text{'mechanochemical-reacted precursor mix'} \quad eq5$$

Conditions: 1) ball milling in Acetone 12 hr@RT followed by 2) decanting/removing acetone $$\text{'Precursor mix'} \rightarrow LiFePO_4+H_2O+N_2/H_{2(g)}+COx(g) \quad [10]$$

Figure 6:
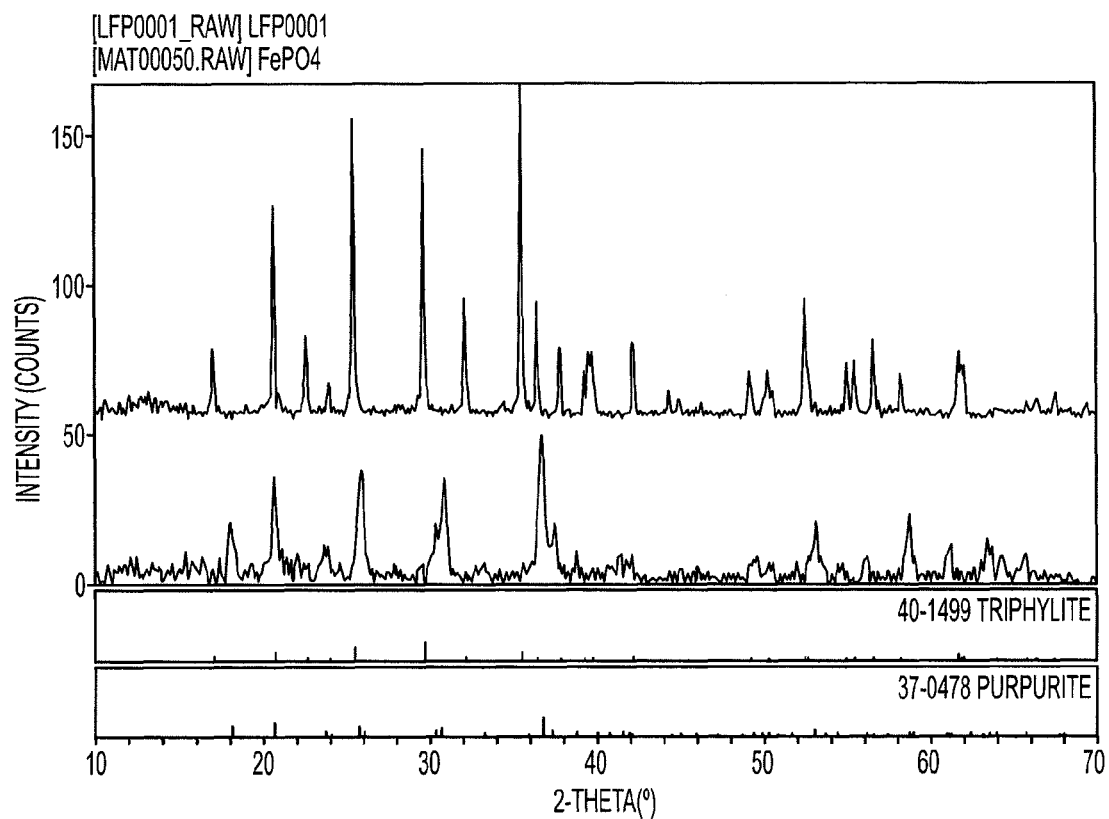
FIG. 6 demonstrates the triphylite $LiFePO_4$ and the delithiated compound $FePO_4$ characterized by powder XRD.

Conditions: 1) 350 C/10 hr/Argon annealing followed by 2) 600 C/10 hr/Argon calcination The first step involves a mechano-chemical process to yield a precursor mix, followed by a second step, in which the precursor mix material is annealed at two different temperatures. In a standard example, 0.937 g of $Li_2CO_3$, 4.10 g of $FeC_2O_4 \cdot 2H_2O$, and 2.77 g of $NH_4H_2PO_4$ were premixed and placed in a 500 ml plastic container. Approximately 200 ml of acetone is added along with 2, 3, & 10 mm diameter $ZrO_2$ ball media to the plastic container. Subsequently, the container with the material was placed on a rolling mill and milled at room temperature for 12 hours. Work-up of the mechanochemical precursor mix involved both decantation and removal of acetone with heat. Next, the product was pelletized and placed in a tube furnace at 350° C. for 10 hours under flowing argon in order to removed residual volatile components. Finally, after recovering the product from the 350° C. anneal step, the material was re-pelletized and placed back into the tube furnace at 600° C. for 10 hours under flowing argon. The resultant product was structurally characterized using powder XRD and was confirmed to be triphylite, $LiFePO_4$ (FIG. 6). In some embodiments, $FePO_4$ is used as a magnesium insertion cathode material.

Chemical de-lithiation of $LiFePO_4$ involved the use of a strong oxidant, namely potassium persulfate as shown in equation 7.

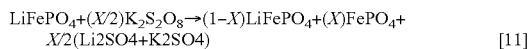

$(0>X>1)$

Figure 7:
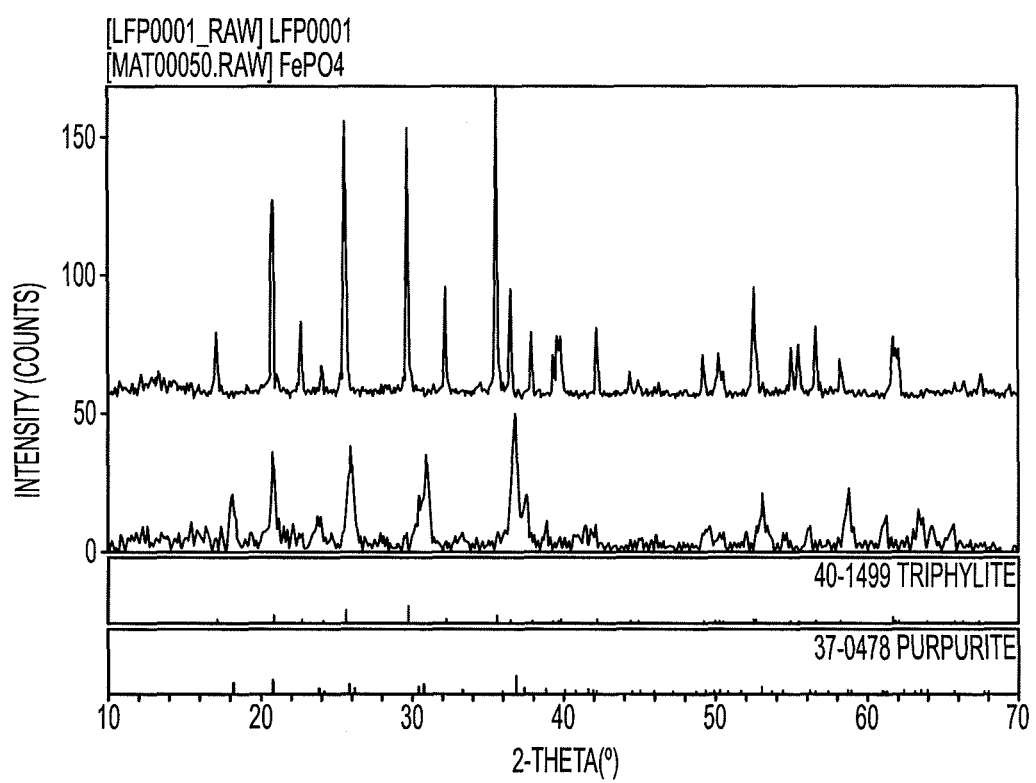
FIG. 7 shows the XRD comparison of lithium iron phosphate, $LiFePO_4$ (Top curve) vs. de-lithiated $LiFePO_4$ (Bottom curve)

A typical de-lithiation example involved adding 2.00 g of $K_2S_2O_8$ with 100 ml of HPLC water in a 250 ml Erlenmeyer flask, until fully dissolved. Subsequently, 0.60 grams of LiFePO4 was added to the solution and stirred for 24 hours at room temperature. Note, that the amount of persulfate was purposely added in excess to ensure reaction completion. After the 24 hours, the product was rinsed with copious amounts of HPLC water and vacuum dried. FIG. 7 illustrates an XRD spectral comparison of the starting LFP material versus the material after chemical de-lithiation.

EXAMPLE 5

Chemical Magging of $VOPO_4$ and $FePO_4$

Figure 8:
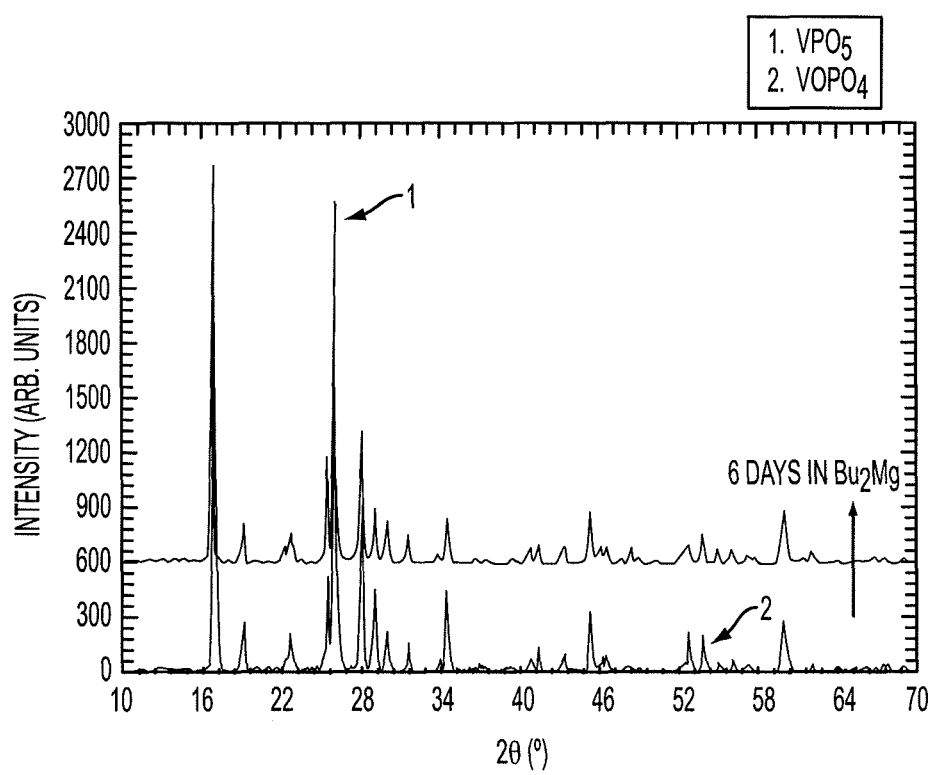
FIG. 8 demonstrates the synthesis of the polyanion compound vanadium oxy-phosphate, $VOPO_4$, followed by chemical insertion of Mg by immersing the dried powder in a solution of Butyl Magnesium in heptanes. The solution was stirred at about 30° C. for 6 days prior to removing the sample for X-Ray diffraction.

This is an example illustrating the chemical Magging of polyanion compounds. FIG. 8 contains the XRD spectra demonstrating the synthesis of the polyanion compound vanadium oxy-phosphate, $VOPO_4$, followed by chemical insertion of Mg by immersing the dried powder in a solution of Butyl Magnesium in heptanes. The solution was stirred at about 30° C. for 6 days prior to removing the sample for X-Ray diffraction. The low angle peaks shifting to lower 2 theta diffraction angles correspond with topotactic Mg insertion into $VOPO_4$.

EXAMPLE 6

Electorchemical Magging of $FePO_4$ in Polyanion Compounds

Figure 9:
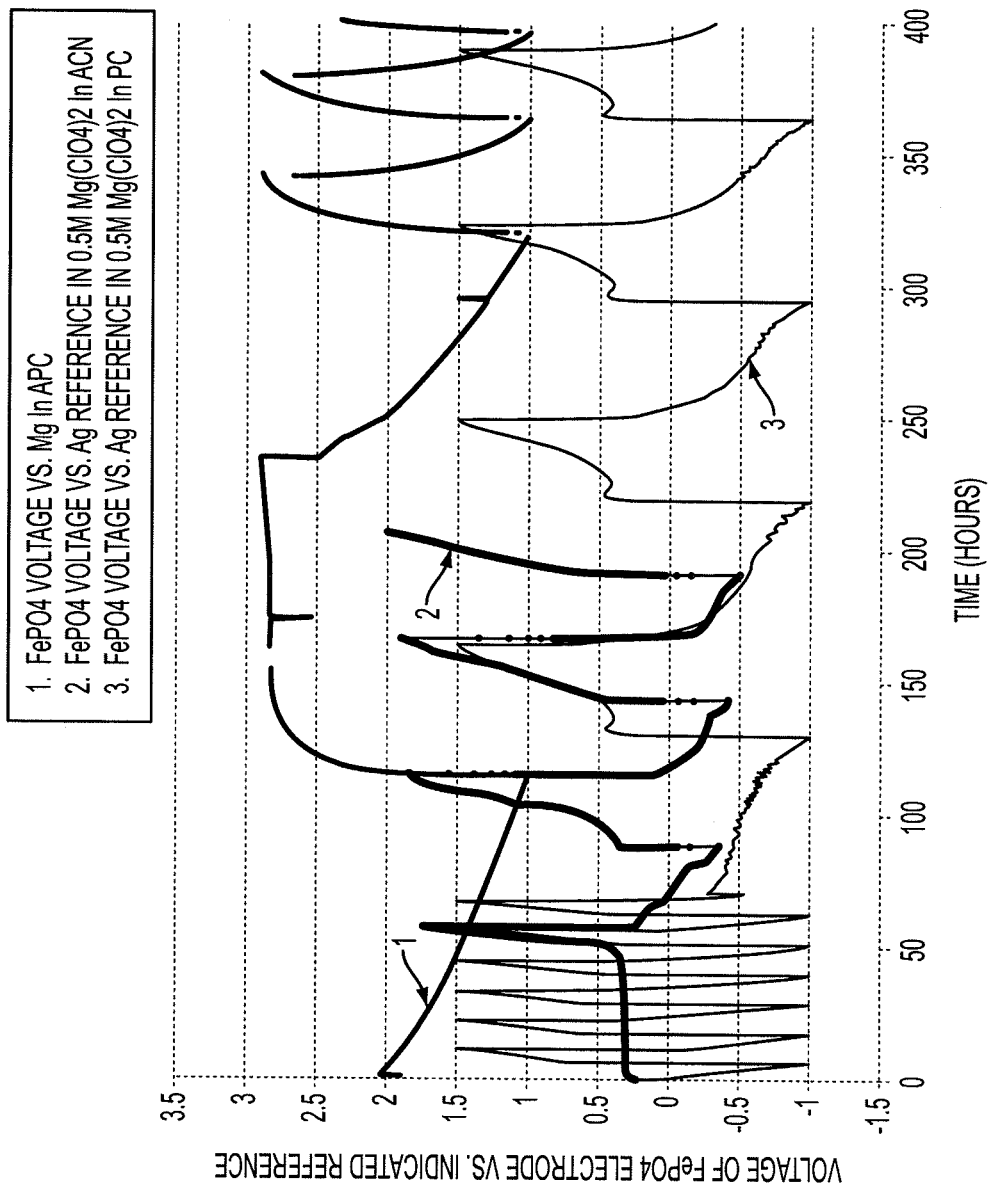
FIG. 9 illustrates the electrochemical Mg insertion into $FePO_4$ in multiple Mg-containing electrolytes.

FIG. 9 illustrates the electrochemical Mg insertion into $FePO_4$ in multiple Mg containing electrolytes. In each case the starting material was $LiFePO_4$ as the active material prepared as a composite electrode with conductive carbon additive, and fluoropolymer as binder. Prior to immersing the electrodes in Mg-ion electrolyte, the $LiFePO_4$ electrode was charged and discharged several times an electrochemical cell in order to remove the Li (i.e., leaving the electrode in the charged state). Thereafter the $FePO_4$ electrode is washed with solvent of like kind and moved to an electrochemical cell containing an Mg-ion conducting electrolyte. FIG. 9 illustrates the voltage measured vs. time during the charge and discharge of $FePO_4$ (post removal of Li) in 3 types of Mg-ion conducting electrolytes. The first consists of "APC" the organo-Mg electrolyte of 0.25M Phenyl Magnesium Chloride:Aluminum Chloride (in 2:1 mol ratio), which enables the use of an Mg metal anode (thus the voltage is presented as V vs. Mg). The second and third Mg-ion conducting electrolytes are similar to one another. The are 0.5 M $Mg(ClO_4)_2$ in Propylene Carbonate, "PC", and 0.5 M $Mg(ClO_4)_2$ in Acetonitrile, "ACN." Being similar electrolytes, which do not enable the straightforward use of an Mg metal anode, the reaction voltages are plotted here with reference to silver (Ag) metal (utilized as a pseudo-reference electrode to monitor the extent of the electrochemical reaction). For the purposes of these tests 0 V vs. Ag is equal to about 2.25 V vs. Mg+/−0.25 V. Each of these 3 Mg-ion conducting electrolytes demonstrates the possibility of charging and discharging cells containing active materials described herein to electrochemically insert and remove Mg from these electrode active materials in a reversible manner.

EXAMPLE 7

Synthesis of Layered and Pseudo-Layered Compounds: $CuCrS_2$, FeOCl and $V_{18}O_{44}$ $CuCrS_2$ Copper chromium sulfide, $CuCrS_2$ is considered a layered compound with anionic chromium sulfide sheets separated by copper cations. $CuCrS_2$ was synthesized via a salt flux method according to the reaction outlined in equation 12:

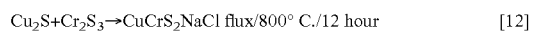

Figure 10:
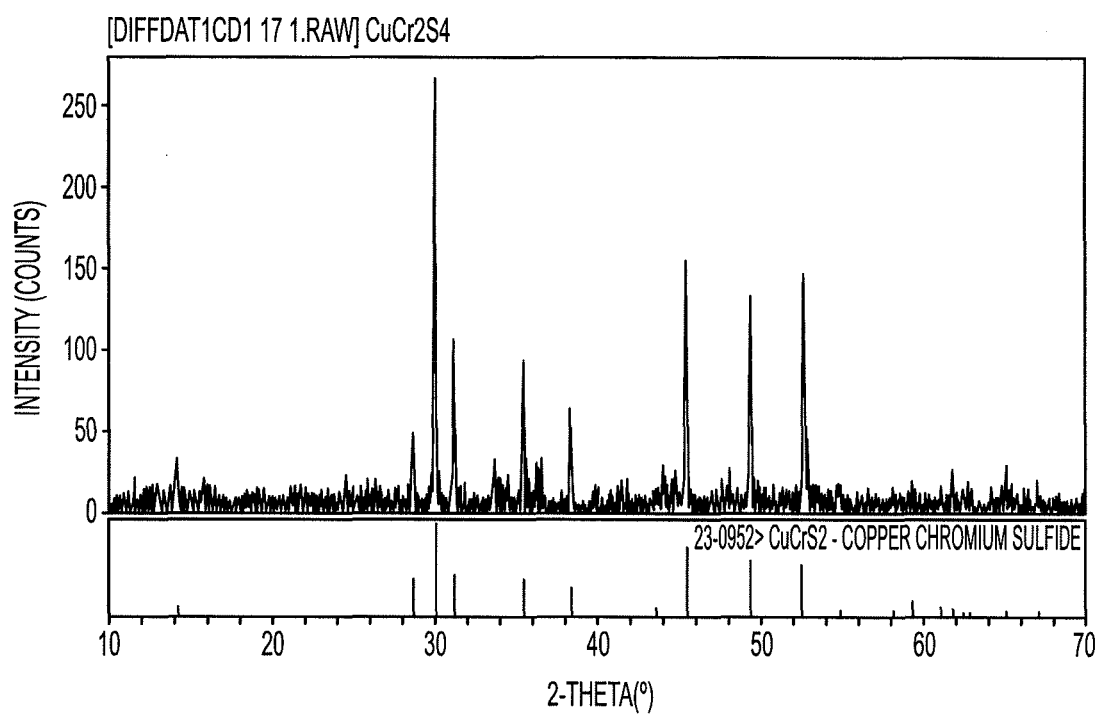
FIG. 10 shows an XRD characterization of the layered material $CuCrS_2$, indexed to PDF reference card 23-0952 with an excellent figure of merit.

A typical reaction involved hand mixing 1.35 g of $Cu_2S$ with 2.84 g of $Cr_2S_3$ and 10.0 g of NaCl and placing the mixture in an Inconel boat. (Note, the NaCl was predried in a vacuum oven for 1.5 hours before use) The mixture was then placed in a tube furnace and heated to 800° C. for 12 hours under flowing argon. The product was recovered from the Inconel boat through multiple rinses with water to remove the salt and dried under dynamic vacuum at 80° C. for 2 hours. FIG. 10 shows an XRD characterization of the material produced, which indexed with an excellent figure of merit to the layered $CuCrS_2$ compound.

FeOCl

Iron oxychloride, FeOCl is a layered compound and was prepared following method as described in equation [13]:

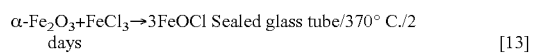

Figure 11:
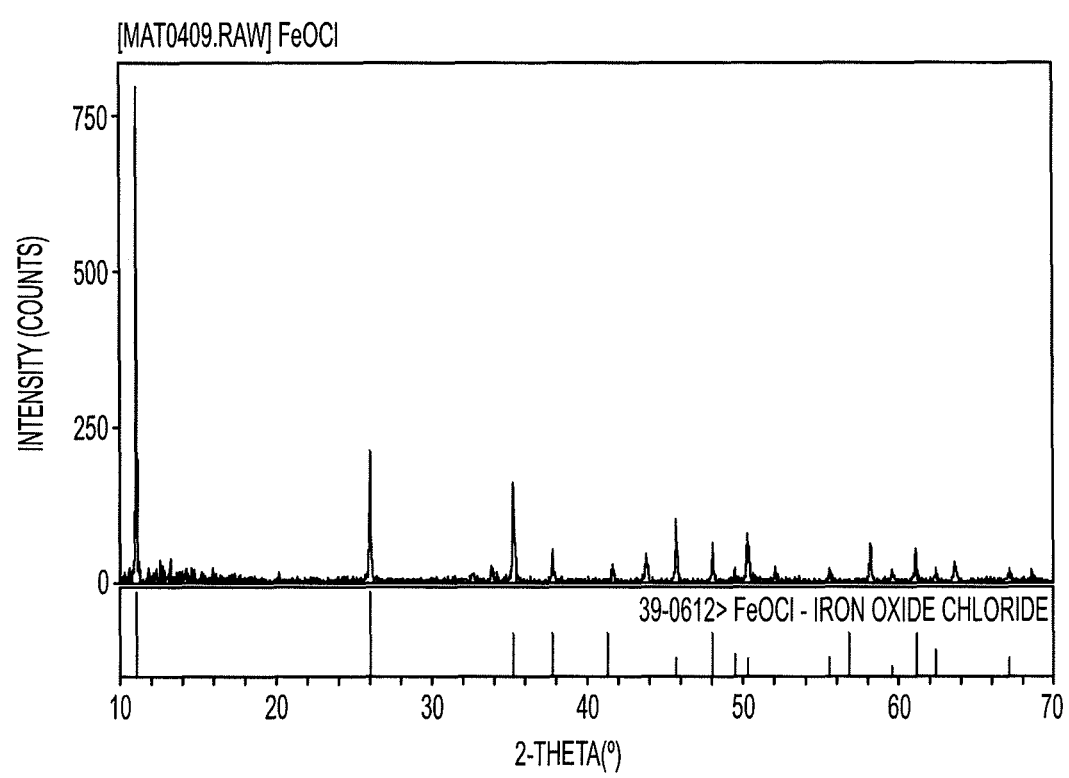
FIG. 11 shows an XRD characterization of the layered material FeOCl, indexed to PDF reference card 39-0612 with a good figure of merit.

A typical reaction involved hand mixing 0.156 g of alpha-$Fe_2O_3$ with 0.344 $FeCl_3$ and charging a glass ampoule (20 cm long×2.0 cm dia×2.0 mm wall thickness). The glass ampoule was vacuum sealed using standard techniques known in the art and placed in a muffle furnace, heated at 370° C. for 48 hours. The formation of dark red-violet plate-like crystals indicated FeOCl formation. Product was first washed with HPLC water to remove any residual $FeCl_3$, then washed with acetone and dried, noting that prolonged exposure to moisture causes FeOCl to hydrolyze. FIG. 11 shows an XRD characterization of the material produced, which indexed with an excellent figure of merit to the layered FeOCl compound.

$V_{12}O_{29}$

Figure 12:
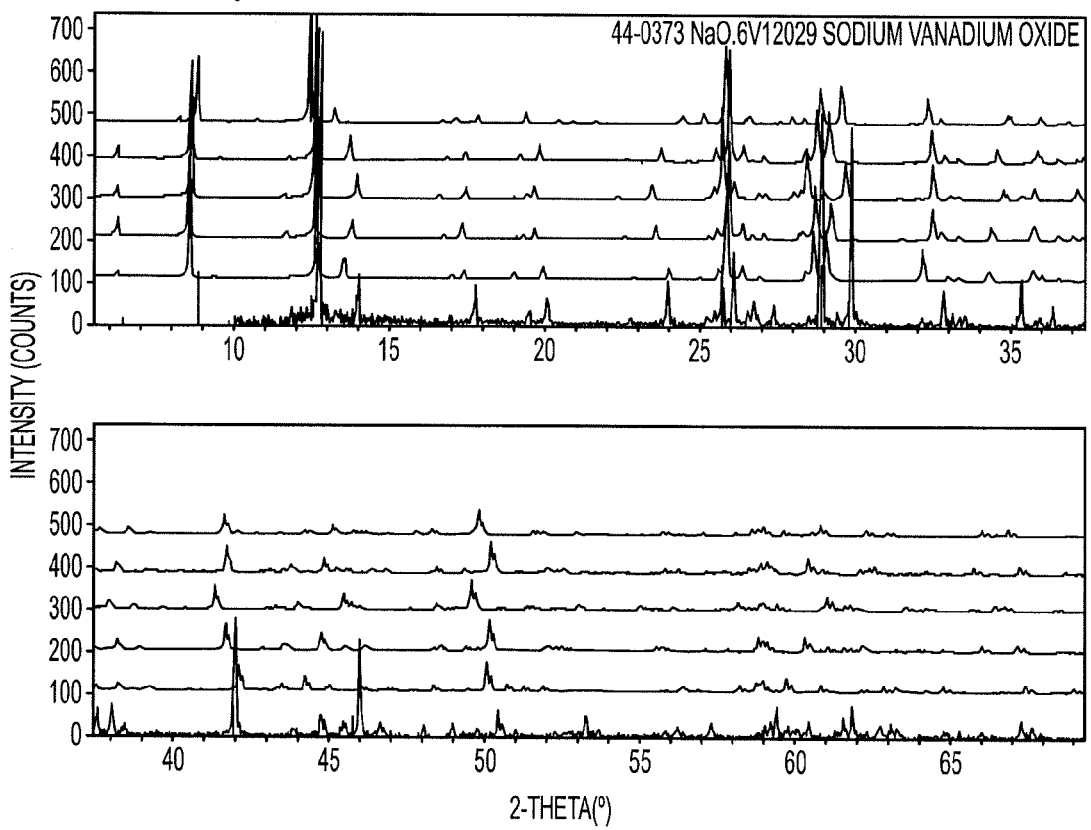
FIG. 12 shows XRD comparisons of experimental and theoretical $Li_xV_{12}O_{29}$ (x=0-3.5) Patterns from top to bottom: theoretical $V_{18}O_{44}$, theoretical $Li_3V_{12}O_{29}$, theoretical $Li_2V_{12}O_{29}$, theoretical $LiV_{12}O_{29}$, theoretical $V_{12}O_{29}$, Actual sample which was indexed to PDF reference card 44-0379 corresponding to $Na_{0.6}V_{12}O_{29}$.

Vanadium oxides with the stoichiometry $V_{18}O_{44}$ and $V_{12}O_{29}$ can be considered similar layered structures with unique properties as compared to the $V_2O_5$ parent layered structure. Experimentally the approach towards targeting these unique materials was to synthesize the lithium salts, namely $Li_xV_{18}O_{44}$ and $Li_xV_{12}O_{29}$ (x=0-3.5). A typical reaction of $Li_xV_{12}O_{29}$ (or $Li_xV_{18}O_{43.5}$) involved first premixing 0.382 g of $LiV_3O_8$ (made via a solid state process as reported in literature) with 0.392 g of $V_2O_5$ and 0.583 g of ammonium metavanadate, $NH_4VO_3$. The mixture was then placed in an alumina crucible and fired at 350° C. for 12 hours followed by an additional calcination for 12 hours at 650° C. After recovering the product, 0.5 g of the material was placed in a beaker with 50 ml of 0.5M HCl and stirred for 4 hours at room temperature. The product was then rinsed with HPLC water to neutral pH and finally calcined for 4 hours at 650° C. The aforementioned process yields $Li_xV_{12}O_{29}$ (x=0-3.5) crystalline powder in fairly high purity as seen in FIG. 12. Structural analysis involved comparing the product to known sodium analogs, namely $Na_{0.6}V_{12}O_{29}$, and to theoretical XRD patterns of topotatic, lithium-inserted $V_{12}O_{29}$ structures. Elemental analysis for exact lithium content was not performed.

What is claimed is:

1. A magnesium battery electrode comprising:
a current collector, and
an electroactive compound in electronic communication with the current collector, the electroactive compound having the formula of $A_{b'}Mg_aM_bX_y$, and a layered structure,
wherein
A is one or more dopants selected from the group consisting of Al, Na, K, Zn, Ag, Cu, and mixtures thereof;
M is one or more transition metals selected from the group consisting of V, Cr, Mn, Fe, Co, Ni, Cu, Ag, Zr, and mixtures thereof;
X is one or more anions selected from the group consisting of O, S, Se, F, and mixtures thereof;
$0 \leq b' \leq 2.9$;
$0 < a \leq 2.1$;
$0.5 \leq b \leq 2.9$;
$1.5 \leq y \leq 5.9$; and
the layered structure comprises close-packed anion X lattice, layers of octahedrally-coordinated transition metal M, and layers of fully or partially occupied magnesium sites, wherein the layers of metal M and the layers of magnesium sites alternate;
provided that the compound is not layered $Mg_aVS_2$ or layered $Mg_aZrS_2$.

2. The magnesium battery electrode of claim 1, wherein b' is 0 and the electroactive compound has a formula of $Mg_aM_bX_y$.

3. The magnesium battery electrode of claim 1, wherein b is about 1 and y is about 2.

4. The magnesium battery electrode of claim 1, wherein b is about 2 and y is about 4.

5. The magnesium battery electrode of claim 1, wherein M is one or more transitional metals selected from the group consisting of Cr, Mn, Ni, Co, and mixtures thereof; and X is one or more anions selected from the group consisting of O, S, F, and mixtures thereof.

6. The magnesium battery electrode of claim 1, wherein the electroactive compound has a unit cell atomic arrangement isostructural with a layered material comprising primarily Mg layer dispersed between primarily transition metal layers.

7. The magnesium battery electrode of claim 1, wherein the electroactive compound has a magnesium diffusion barrier of less than 0.8 eV.

8. The magnesium battery electrode of claim 1, wherein 0.05 b'3.9.

9. The magnesium battery electrode of claim 1, wherein the electrode comprises an electrode layer comprising the electroactive compound, said electrode layer disposed on the current collector.

10. The magnesium battery electrode of claim 9, wherein the electrode layer further comprises an electronically conductive additive.

11. The magnesium battery electrode of claim 9, wherein the electrode layer further comprises a binder.

12. An energy-storing device comprising a first magnesium battery electrode of claim 1.

13. The energy-storing device of claim 12, further comprising a second magnesium battery electrode selected from the group consisting of a magnesium battery electrode of claim 1, and a magnesium battery electrode comprising a magnesium metal or alloy as the electroactive material.

* * * * *